US012451701B2

(12) United States Patent
Yu et al.

(10) Patent No.: US 12,451,701 B2
(45) Date of Patent: Oct. 21, 2025

(54) SHUTDOWN DEVICE, COMMUNICATION METHOD FOR SHUTDOWN DEVICE, AND RAPID SHUTDOWN PHOTOVOLTAIC SYSTEM

(71) Applicant: HOYMILES POWER ELECTRONICS INC., Zhejiang (CN)

(72) Inventors: Hongbin Yu, Zhejiang (CN); Shigao Zhou, Zhejiang (CN); Yanwei Wu, Zhejiang (CN); Yi Zhao, Zhejiang (CN); Bo Yang, Zhejiang (CN)

(73) Assignee: HOYMILES POWER ELECTRONICS INC., Zhejiang (CN)

( * ) Notice: Subject to any disclaimer, the term of this patent is extended or adjusted under 35 U.S.C. 154(b) by 25 days.

(21) Appl. No.: 18/700,132

(22) PCT Filed: Oct. 19, 2022

(86) PCT No.: PCT/CN2022/126260
§ 371 (c)(1),
(2) Date: Apr. 10, 2024

(87) PCT Pub. No.: WO2023/066317
PCT Pub. Date: Apr. 27, 2023

(65) Prior Publication Data
US 2024/0405540 A1 Dec. 5, 2024

(30) Foreign Application Priority Data

Oct. 20, 2021 (WO) ............... PCT/CN2021/124879

(51) Int. Cl.
*H02J 3/38* (2006.01)
*H02H 7/20* (2006.01)
*H02J 13/00* (2006.01)

(52) U.S. Cl.
CPC ................ *H02J 3/38* (2013.01); *H02H 7/20* (2013.01); *H02J 3/381* (2013.01);
(Continued)

(58) Field of Classification Search
CPC ........ H02J 3/38; H02J 13/00; H02J 13/00002; H02J 13/00007; H02J 3/381; H02J 2300/24; H02H 7/20
See application file for complete search history.

(56) References Cited

U.S. PATENT DOCUMENTS

2018/0248359 A1  8/2018  Zou et al.
2020/0335976 A1  10/2020  Wei et al.

FOREIGN PATENT DOCUMENTS

CN   102624427 A    8/2012
CN   112821458 A    8/2018
CN   110429580 A    11/2019

OTHER PUBLICATIONS

ISR for International Application PCT/CN2022/126260 mailed Nov. 29, 2022.
(Continued)

Primary Examiner — Robert L Deberadinis
(74) Attorney, Agent, or Firm — Ladas & Parry LLP

(57) ABSTRACT

A shutdown device, including a first shutdown module, a second shutdown module, and a control module are disclosed. The first shutdown module includes a first switching device for controlling an output power of a first direct-current power supply coupled to a first input port; and the second shutdown module includes a second switching device for controlling an output power of a second direct-current power supply coupled to a second input port, where the control module modulates a power control signal and a first communication signal to generate a first composite control signal, and the first composite control signal controls the first switching device to work in a high-frequency
(Continued)

switching state to superimpose a current ripple signal including the first communication signal onto a power bus; and the control module further generates a switching control signal, to control the second switching device.

20 Claims, 7 Drawing Sheets

(52) U.S. Cl.
CPC .. *H02J 13/00002* (2020.01); *H02J 13/00007* (2020.01); *H02J 2300/24* (2020.01)

(56) References Cited

OTHER PUBLICATIONS

Written Opinion for International Application PCT/CN2022/126260 mailed Nov. 29, 2022.

SHUTDOWN DEVICE, COMMUNICATION METHOD FOR SHUTDOWN DEVICE, AND RAPID SHUTDOWN PHOTOVOLTAIC SYSTEM

CROSS-REFERENCE TO RELATED APPLICATIONS

This application is an application under 35 U.S.C. 371 of International Application No. PCT/CN2022/126260 filed on 20 Oct. 2021. This application claims priority to Chinese Patent Application No. PCT/CN2021/124879, filed on Oct. 20, 2021 and entitled "SHUTDOWN DEVICE, COMMUNICATION METHOD FOR SHUTDOWN DEVICE, AND RAPID SHUTDOWN PHOTOVOLTAIC SYSTEM", which are incorporated herein by reference in its entirety.

TECHNICAL FIELD

The present invention relates to the field of distributed photovoltaic power generation technologies, and in particular, to a shutdown device, a communication method for a shutdown device, and a rapid shutdown photovoltaic system.

BACKGROUND

Over recent years, with joint efforts of upstream and downstream photovoltaic industry chains, a price of photovoltaic power generation has gradually become lower than a power purchase price and even a power generation cost of conventional coal power. A photovoltaic installed capacity has grown rapidly year by year, and will become a main source of power generation in the near future.

Due to its advantages such as a mature technology, high conversion efficiency, a high integration level, and a low price, a string photovoltaic system has been widely used in a distributed photovoltaic system such as a household rooftop and an industrial and commercial rooftop, as well as a ground power station. However, when the photovoltaic system catches fire, a direct-current high voltage of the string photovoltaic system brings a serious risk of electric shock to fire extinguishment on a roof. Fire extinguishment is extremely difficult, and in most cases the fire can only be allowed to spread. To resolve the fire extinguishment safety problem of a rooftop photovoltaic system, a module-level rapid shutdown function is required by a 2017 version of the United States National Electrical Code NEC, which requires the voltage on any conductor in a photovoltaic array to drop below 80V within 30 seconds after the rapid shutdown function is triggered, and the voltage on any external conductor not in the photovoltaic array to drop below 30V within 30 s. Subsequently, evaluation methods for a rapid shutdown apparatus and a rapid shutdown system are also added to the UL1741 standard.

A solution for the string photovoltaic system to meet the NEC 2017 rapid shutdown requirement is to add module-level rapid shutdown device, including a shutdown device and an optimizer. The shutdown device is widely used in the string photovoltaic system due to the low cost, and most shutdown devices are compatible with the Sunspec rapid shutdown protocol, so they can be replaced by each other.

The Sunspec rapid shutdown protocol is a simple and reliable simplex power line carrier communication (PLC) protocol. A conventional shutdown device using the protocol is simple, reliable, and low-cost. However, the conventional shutdown device can only receive the PLC signal, and it cannot send information, so module-level monitoring cannot be achieved. When a shutdown device or a module is abnormal, it costs lots of time to find the abnormal one in a large photovoltaic system. Some manufacturers replace a Sunspec rapid shutdown protocol receiver in the shutdown device with a power line carrier transceiver module, achieving the duplex communication of the shutdown device, and thereby providing module-level monitoring, but it increases the cost. There are also other manufacturers that replace the Sunspec rapid shutdown protocol receiver with a wireless communication transceiver to achieve the duplex communication. However, wireless communication is not very stable in the application. A relay is needed to improve stability of communication, which increases system complexity and cost.

SUMMARY

In view of this, an objective of the present invention is to provide a shutdown device, a communication method for a shutdown device, and a rapid shutdown photovoltaic system, which may improve the integration level and power density of the shutdown device, and significantly reduce the production cost of a product.

To achieve the foregoing objective, the present invention provides a shutdown device, including:
a first input port, configured to be coupled to a first direct-current power supply;
at least one second input port, configured to be coupled to a second direct-current power supply;
an output port, configured to be coupled to a power bus;
a first shutdown module, connected to the first input port, where the first shutdown module includes a first switching device, and the first switching device is configured to control an output power of the first direct-current power supply coupled to the first input port; and
at least one second shutdown module, connected to the second input port, where the second shutdown module includes a second switching device, and the second switching device is configured to control an output power of the second direct-current power supply coupled to the second input port, where
an output of the first shutdown module and an output of the at least one second shutdown module are connected in series, and are connected to the output port;
a control module, configured to modulate a power control signal and a first communication signal, to generate a first composite control signal, where the power control signal adjusts the output power of the first direct-current power supply coupled to the first input port, and the first composite control signal controls the first switching device to work in a high-frequency switching state, to superimpose a current ripple signal including the first communication signal onto the power bus; and
the control module being further configured to generate a switching control signal, to control a switching of the second switching device.

Further, the control module adjusts an amplitude of the power control signal according to a power bus current, and further controls a duty cycle of the first composite control signal, to keep a peak value of a voltage ripple at the input port of the shutdown device within a predetermined ripple threshold.

Further, the duty cycle of the first composite control signal is positively correlate with the power bus current, the larger the power bus current is, the larger the duty cycle is, and conversely, the smaller the duty cycle is.

Further, the control module includes:
a power control unit, configured to generate the power control signal according to the power bus current;
a modulation unit, configured to receive the first communication signal and the power control signal, and modulate the first communication signal and the power control signal to generate the first composite control signal; and
a switching control unit, configured to generate the switching control signal that controls the switching of the second switching device.

Further, the control module further includes:
a monitoring unit, configured to collect and obtain operating data of the shutdown device;
a comprehensive control unit, configured to package the operating data of the shutdown device into a first data packet; and
a protocol processing unit, configured to encapsulate the first data packet into the first communication signal according to a predetermined communication protocol, and provide the first communication signal to the modulation unit.

Further, during data transmitting, the comprehensive control unit packages the operating data of the shutdown device into the first data packet and provides the first data packet to the protocol processing unit, the first composite control signal controls the first switching device to work in the high-frequency switching state, and the switching control signal controls the second switching device to be in an always-on state; and
when data transmitting is completed, the first composite control signal controls the first switching device to be in an always-on state, and the switching control signal controls the second switching device to remain in the always-on state.

Further, the shutdown device further includes a signal decoupling module, configured to separate a power line carrier signal on the power bus from the power bus current, to extract the power line carrier signal;
the control module further includes a demodulation unit, configured to demodulate the extracted power line carrier signal to obtain a second communication signal; and
the protocol processing unit is further configured to parse the second communication signal into a second data packet according to a protocol format, and provide the second data packet to the comprehensive control unit, and the comprehensive control unit parses the second data packet, to obtain control instructions in the second data packet, where the control instructions are used to control a working state of the shutdown device.

Further, when an input state of the first input port of the shutdown device is abnormal, the control module controls the duty cycle of the first composite control signal according to an input voltage of the first shutdown module during data transmitting.

Further, when a peak value of the input voltage of the first shutdown module is greater than or equal to a preset first reference voltage, the duty cycle of the first composite control signal is increased, and when the peak value of the input voltage of the first shutdown module is less than the first reference voltage, the duty cycle of the first composite control signal is reduced.

Further, when an average value of the input voltage of the first shutdown module is greater than or equal to a preset second reference voltage, the duty cycle of the first composite control signal is increased, and when the average value of the input voltage of the first shutdown module is less than the second reference voltage, the duty cycle of the first composite control signal is reduced.

Further, when monitoring that the input voltage of the first shutdown module of the shutdown device is less than a preset voltage threshold, the monitoring unit determines that the input state of the first input port is abnormal, otherwise determines that the input state of the first input port is normal, and outputs an input state detection signal used to represent the input state of the first input port.

Further, the control module further includes:
a voltage control unit, configured to generate a voltage control signal according to the input voltage of the first shutdown module; and
a selection unit, separately connected to the power control unit and the voltage control unit, and configured to select to output the power control signal or the voltage control signal according to the input state detection signal, to control the duty cycle of the first composite control signal.

Further, when the input state of the first input port is normal, the selection unit selects to output the power control signal, and the modulation unit modulates the first communication signal and the power control signal, to generate the first composite control signal; and
when the input state of the first input port is abnormal, the selection unit selects to output the voltage control signal during data transmitting, the modulation unit modulates the first communication signal and the voltage control signal, to generate the first composite control signal, and when data transmitting is completed, the selection unit selects to output the power control signal.

Further, the voltage control unit includes:
an error amplifier, configured to obtain an amplified value of a difference between the input voltage of the first shutdown module and a reference voltage; and
a controller, configured to generate the voltage control signal according to the amplified value of the difference.

Further, a second direct-current power supply connected to a second shutdown module adjacent to the first shutdown module is configured to supply power to the control module.

Further, the shutdown device further includes a sampling resistor, separately connected to the first shutdown module and a second shutdown module adjacent to the first shutdown module, the sampling resistor is for obtaining a power bus current value, and a connection point between the sampling resistor and the first shutdown module serves as a common ground.

To achieve the foregoing objective, the present invention provides a communication method for a shutdown device, including:
modulating a power control signal and a first communication signal, to generate a first composite control signal, where the power control signal is used to adjust an output power of a first direct-current power supply coupled to a first input port of the shutdown device; and
controlling a first switching device of the first input port of the shutdown device to work in a high-frequency switching state by the first composite control signal, to superimpose a current ripple signal including the first communication signal onto a power bus; and
providing a switching control signal, where the switching control signal is used to control a switching of a second switching device of a second input port of the shutdown device.

Further, the method further includes:
adjusting an amplitude of the power control signal according to a power bus current of the shutdown device, and further controlling a duty cycle of the first composite control signal, to keep a peak value of a voltage ripple at the input port of the shutdown device within a predetermined ripple threshold.

Further, the method further includes:
during data transmitting, generating the power control signal according to a power bus current, and modulating the power control signal and the first communication signal to generate the first composite control signal, where the first composite control signal controls the first switching device of the shutdown device to work in the high-frequency switching state, and the switching control signal controls the second switching device of the shutdown device to be in an always-on state; and
when data transmitting is completed, the first composite control signal controls the first switching device to be in an always-on state, and the switching control signal controls the second switching device to remain in the always-on state.

Further, the method further includes:
when an input state of the first input port of the shutdown device is abnormal, controlling a duty cycle of the first composite control signal according to an input voltage of a first shutdown module of the shutdown device during data transmitting.

Further, the method further includes:
when a peak value of the input voltage of the first shutdown module is greater than or equal to a preset first reference voltage, the duty cycle of the first composite control signal is increased, and when the peak value of the input voltage of the first shutdown module is less than the first reference voltage, the duty cycle of the first composite control signal is reduced.

Further, the method further includes:
when an average value of the input voltage of the first shutdown module is greater than or equal to a preset second reference voltage, the duty cycle of the first composite control signal is increased, and when the average value of the input voltage of the first shutdown module is less than the second reference voltage, the duty cycle of the first composite control signal is reduced.

Further, the method further includes:
when the input state of the first input port of the shutdown device is normal, modulating the first communication signal and the power control signal, to generate the first composite control signal; and
when the input state of the first input port of the shutdown device is abnormal, generating a voltage control signal according to the input voltage of the first shutdown module, and modulating the first communication signal and the voltage control signal to generate the first composite control signal during data transmitting, and when data transmitting is completed, modulating the first communication signal and the power control signal, to generate the first composite control signal.

To achieve the foregoing objective, the present invention provides a rapid shutdown photovoltaic system. The system includes a plurality of shutdown devices, a plurality of photovoltaic modules, a main controller, and a photovoltaic inverter, each shutdown device is connected to a first photovoltaic module and a second photovoltaic module, the plurality of shutdown devices are connected in series to a power bus, the power bus is connected to a direct-current input port of the photovoltaic inverter, the shutdown device includes a first input port, at least one second input port, a first shutdown module connected to the first input port, a second shutdown module connected to the second input port, an output port, and a control module, the first shutdown module includes a first switching device, and the second shutdown module includes a second switching device, where
the shutdown device is configured to modulate a power control signal and a first communication signal to generate a first composite control signal, where the power control signal adjusts an output power of a first photovoltaic module coupled to the first input port, and the first composite control signal controls the first switching device to work in a high-frequency switching state, to superimpose a current ripple signal including the first communication signal onto the power bus, and the shutdown device is further configured to generate a switching control signal, to control a switching of the second switching device; and
the main controller is configured to extract the current ripple signal on the power bus, and demodulate and parse the current ripple signal to obtain the first communication signal transmitted by the shutdown device.

The shutdown device in the present invention includes a plurality of input ports, which is a multi-input topology, and may select a switching device of a shutdown module corresponding to any input port to work in the high-frequency switching state, for coupling the operating data of the shutdown device to the power bus to achieve data transmitting. A plurality of shutdown modules share one control module, which improves integration level and power density of the shutdown device, and significantly reduces the cost of a product. In a shutdown device with a plurality of input ports, when the photovoltaic module connected to the shutdown module configured to transmit data is abnormal, the duty cycle of the composite control signal is adjusted according to the input voltage of the shutdown module, thereby increasing the amplitude of the power line carrier signal, so that the data transmitting can keep normal when the photovoltaic module is abnormal.

DETAILED DESCRIPTION

The present invention will be described in detail below with reference to specific implementations shown in the accompanying drawings. However, these implementations do not limit the present invention, and structural, method, or functional transformations made by a person of ordinary skill in the art according to these implementations are included in a protection scope of the present invention.

Figure 1:
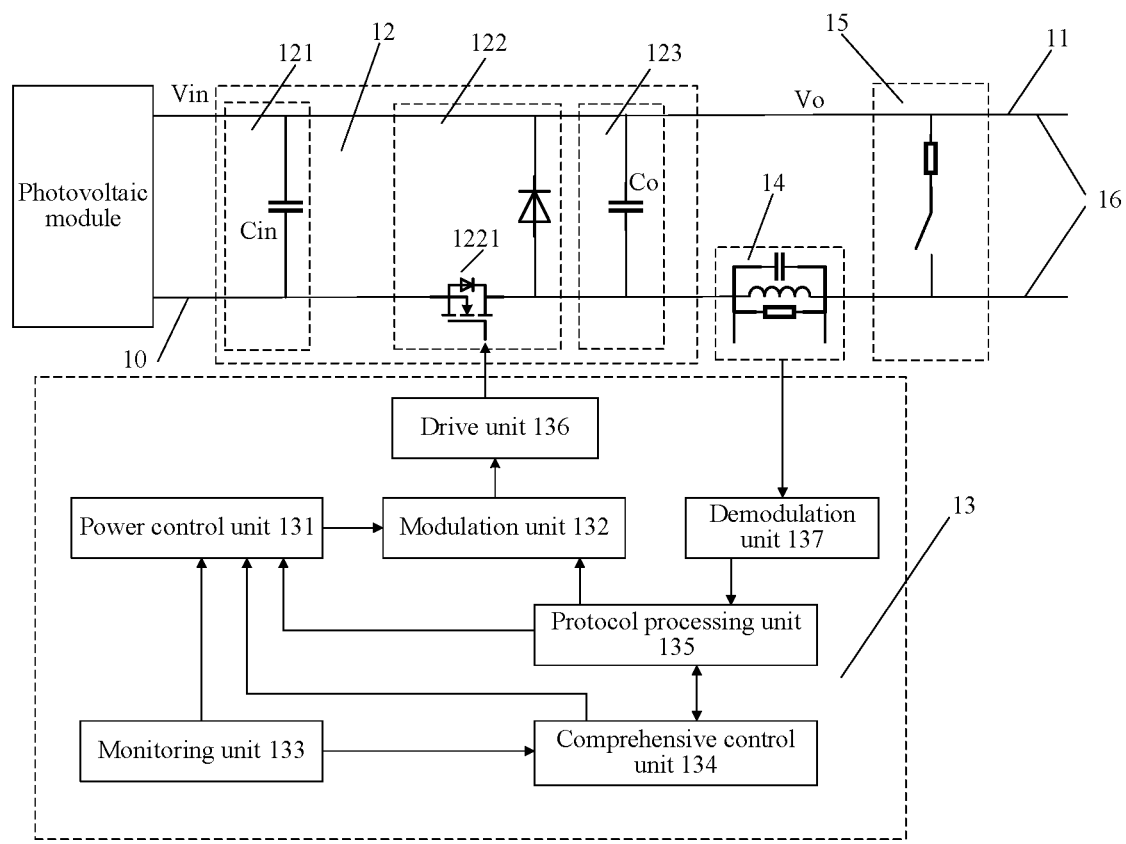
FIG. 1 is a system block diagram of a shutdown device according to a first embodiment of the present invention.

As shown in FIG. 1, in an embodiment of the present invention, the present invention provides a shutdown device. The shutdown device includes:

at least one input port 10, configured to be coupled to a direct-current power supply;

an output port 11, configured to be coupled to a power bus;

at least one shutdown module 12, where one shutdown module 12 corresponds to one input port 10, and includes at least one switching device 1221, and the switching device 1221 is configured to control an output power of the direct-current power supply coupled to the input port 10; and a control module 13, configured to modulate a power control signal and a first communication signal, to generate a first composite control signal, where the power control signal is used to adjust the output power of the direct-current power supply coupled to the input port 10; and the first composite control signal is used to control the switching device 1221 to work in a high-frequency switching state, to superimpose a current ripple signal including the first communication signal onto the power bus.

The direct-current power supply includes at least one cell, which is usually one photovoltaic module or two photovoltaic modules connected in series. An example in which a photovoltaic module is used as the direct-current power supply is described in the present invention. One input port 10 corresponds to one photovoltaic module. In other embodiments, the shutdown module 12 includes, for example, a plurality of switching devices connected in series and/or parallel, and a data transmitting function is implemented by controlling any switching device to work in the high-frequency switching state.

An example in which the shutdown device includes an input port 10, an output port 11, a shutdown module 12, and a control module 13, and the shutdown module 12 includes a switching device 1221 is used for description below, but the invention is not limited to the example.

The switching device 1221 is connected between the input port 10 and the output port 11, to control the output power of the photovoltaic module coupled to the input port 10. The switching device 1221 may be located between a high electric potential terminal of the input port 10 and a high electric potential terminal of the output port 11, or may be located between a low electric potential terminal of the input port 10 and a low electric potential terminal of the output port 11. In this embodiment, an example in which the switching device 1221 is located between the low electric potential terminal of the input port 10 and the low electric potential terminal of the output port 11 is used. The control module 13 is coupled to the shutdown module 12. The first composite control signal is generated to control the switching device 1221 according to the first communication signal and the power bus current. The first composite control signal adjusts the output power of the photovoltaic module coupled to the input port 10 of the shutdown device, and controls the switching device 1221 to work in the high-frequency switching state, to couple the first communication signal to the power bus for transmission. The power bus connects output ports of a plurality of shutdown devices in series to connect to a photovoltaic inverter. The length of the power bus ranges from tens to hundreds of meters, and the parasitic inductance usually ranges from 7.8 uH to 269 uH. The power bus current is controlled by the photovoltaic inverter. The photovoltaic inverter adjusts the power bus current to maximize the output power of each photovoltaic module in the photovoltaic system.

The first communication signal includes communication data of the shutdown device, and the communication data includes operating data of the shutdown device, but the invention is not limited to the example. In other embodiments, the first communication signal may further include any other data that needs to be transmitted.

As an implementation of the present invention, the control module 13 adjusts an amplitude of the power control signal according to a power bus current to control a duty cycle of the first composite control signal, to keep a peak value of a voltage ripple at the input port of the shutdown device within a predetermined ripple threshold, thereby avoiding large fluctuations of a steady-state operating point of the photovoltaic module photovoltaic module, which reduces the output power of the photovoltaic module when the switching device 1221 switches at a high frequency. The duty cycle of the first composite control signal is positively correlate with the power bus current, the larger the power bus current is, the larger the duty cycle is, and conversely, the smaller the duty cycle is.

As an implementation of the present invention, the shutdown module 12 further includes an input unit 121 coupled to the input port 10 and an output unit 123 coupled to the output port 11. The input unit 121 includes an input capacitor Cin, used to stabilize an input voltage Vin of the shutdown device. The output unit 123 includes an output capacitor Co, used to stabilize an output voltage Vo of the shutdown device.

The principle of a shutdown device transmitting the first communication signal through the high-frequency switching of the switching device 1221 is described as follows. When the switching device 1221 works in the high-frequency switching state, during an off process of the switching device 1221, because the line parasitic inductance of the power bus is large enough, and its storage energy cannot change suddenly under the energy storage inertia effect, the power bus current almost remains unchanged, the output voltage Vo of the output port 11 decreases linearly, and a drop voltage ΔVo is shown in Formula (1):

$$\Delta Vo = (I \cdot (1-D) \cdot T)/C_o, \quad (1)$$

where I is the power bus current, T is the cycle of the first composite control signal, D is the duty cycle of the first composite control signal, and $C_o$ is the capacitance of the output capacitor $C_o$.

During the off process of the switching device 1221, an output current of the photovoltaic module charges the input capacitor Cin, and the input voltage Vin across the input capacitor Cin is raised. When the photovoltaic module works at a maximum power point due to the control of the photovoltaic inverter, the input voltage Vin of the shutdown device fluctuates slightly, and a fluctuation value is less than 10% of the output voltage of the photovoltaic module, which has little impact on the output current of the photovoltaic module. The output current of the photovoltaic module may be considered to be basically unchanged, approximately equal to the power bus current, the input voltage Vin of the shutdown device rises linearly in the period, and an overcharge voltage ΔVin of the shutdown device is shown in Formula (2):

$$\Delta Vin = (I \cdot (1-D) \cdot T)/C_{in}, \quad (2)$$

$C_{in}$ is the capacitance of the input capacitor Cin.

When the switching device 1221 is on, energy stored in the input capacitor Cin during the off process of the switching device 1221 is quickly transferred to the output capacitor Co through the switching device 1221, thereby compensating the energy discharged by the output capacitor Co during the off process of the switching device 1221. In addition, the input voltage Vin and output voltage Vo of the shutdown device return to a steady-state voltage, and the output voltage of the photovoltaic module also returns to the steady-state voltage. The photovoltaic inverter still controls the output voltage of the photovoltaic module by adjusting the power bus current, so that the photovoltaic module works at a maximum power point. In addition, the shutdown device needs to adjust the duty cycle D according to the power bus current, for example, according to the proportional relationship in Formula (1) or Formula (2), to guarantee that when the switching device 1221 is turned off, the overcharge voltage ΔVin of the input voltage Vin of the shutdown device is less than 10% of the output voltage of the photovoltaic module, thereby preventing the working point of the photovoltaic module from deviating from the maximum power point, reducing the output power of the photovoltaic module.

When the switching device 1221 works in a high-frequency switching state, the output voltage Vo of the shutdown device includes abundant high-frequency switching harmonics. By performing fourier transformation on the output voltage Vo, a direct-current component, a fundamental component, and other harmonic components of the output voltage Vo are obtained, where the frequency of the fundamental component is the switching frequency of the switching device 1221. Under the excitation of the fundamental component of the output voltage Vo, a corresponding fundamental current ripple is generated on the power bus. According to the foregoing analysis, the fundamental component included in the output voltage of the shutdown device is modulated according to the first communication signal containing the operating data of the shutdown device, the power line carrier signal carrying the first communication signal may be injected into the power bus, and data transmitting function of the shutdown device may be implemented. In this embodiment, the power line carrier signal is a fundamental component of a current ripple signal, namely, the fundamental current ripple.

Figure 2:
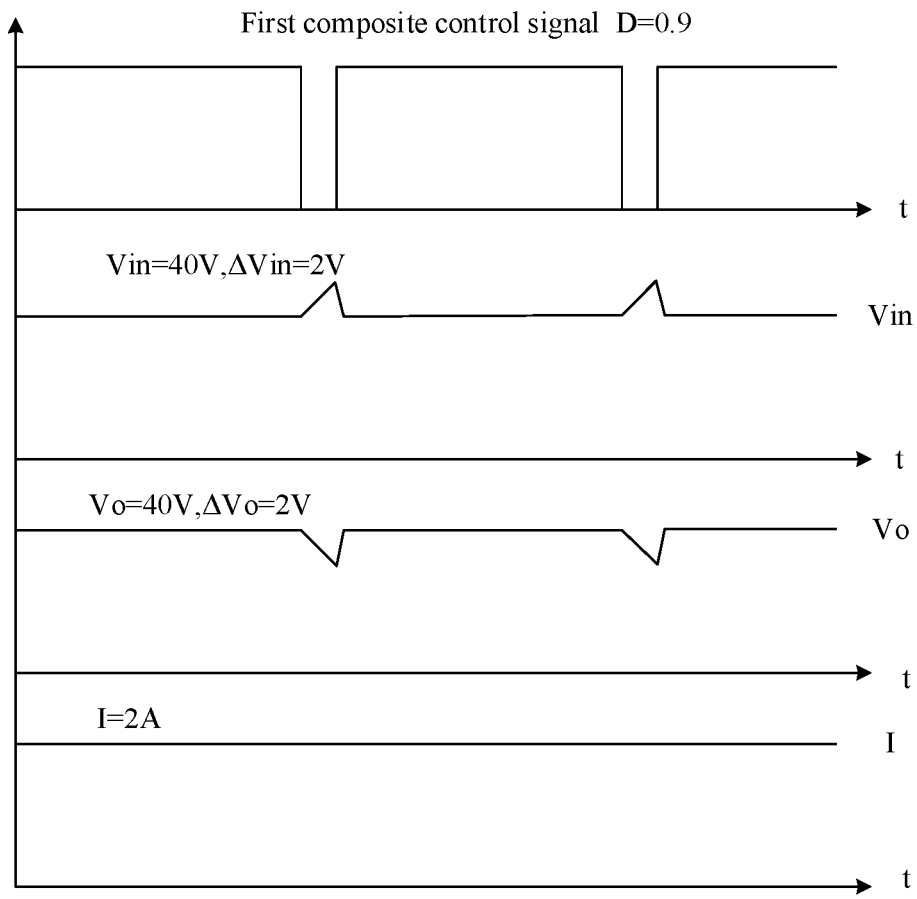
FIG. 2 is a waveform diagram of input and output voltages when a shutdown device performs data transmitting according to an embodiment of the present invention.

As an implementation of the present invention, a typical value of the input capacitor Cin of the shutdown device is 1 uF, a typical value of the output capacitor Co is 1 uF, a switching frequency is 100 kHz, and an impedance of the power bus at the switching frequency is 100 ohms. When the input voltage Vin of the shutdown device is 40V, the power bus current is 2 A, and the overcharge voltage ΔVin is controlled to 2V. According to Formula (1) and Formula (2), the duty cycle D=0.9, the drop voltage ΔVo is 2V, and a waveform of the input voltage Vin and a waveform of the output voltage Vo are shown in FIG. 2. By performing fourier transformation on the waveform of the output voltage Vo, a direct-current component, a fundamental component, and other harmonic components of the output voltage Vo are obtained, where an amplitude of the fundamental component of 100 kHz is 100 mV, and the fundamental component of the output voltage Vo generates a fundamental current ripple with an amplitude of 1 mA on the power bus; and when the input voltage Vin of the shutdown device is 40V, the power bus current is 10 A, and the overcharge voltage ΔVin is controlled to 2V. According to Formula (1) and Formula (2), the duty cycle D=0.98, and the drop voltage ΔVo is 2V. By performing fourier transformation on the waveform of the output voltage Vo, it can be seen that the amplitude of the fundamental component of the output voltage Vo is 38 mV. The fundamental component of the output voltage Vo generates a fundamental current ripple with an amplitude of 0.38 mA on the power bus.

As an implementation of the present invention, the control module 13 includes a power control unit 131 and a modulation unit 132. The power control unit 131 generates the power control signal according to the power bus current, and outputs the power control signal to the modulation unit 132. The modulation unit 132 is configured to receive the first communication signal and the power control signal, and modulate the first communication signal and the power control signal, to generate the first composite control signal. The first composite control signal controls the switching device 1221 to perform high-frequency switching. The first composite control signal controls the switching device 1221 to operate at a high frequency, generating a corresponding fundamental component of the output voltage at the output port of the shutdown device. Under the excitation of the fundamental component of the output voltage, a corresponding fundamental current ripple is generated on the power bus, thereby coupling the first communication signal containing operating data to the power bus. A current ripple signal carrying operating data is generated on the power bus, the data transmitting function of the shutdown device is implemented. And the data transmitting function of the shutdown device may be implemented without a power line carrier transceiver module or a wireless communication module in the conventional shutdown device.

The modulation unit 132 modulates the received power control signal and the first communication signal to generate the first composite control signal. The power control signal and the first communication signal are modulated based on a plurality of mature modulation technologies, in other words, the fundamental component in the output voltage of the shutdown device is modulated, so that the fundamental current ripple on the power bus carries the first communication signal containing the operating data of the shutdown device. Mature modulation technologies that may be used include frequency shift keying (FSK), phase shift keying (PSK), and the like. The FSK modulation technology, which has good anti-noise and anti-attenuation properties, is easy to implement, and has been widely used in digital communication at a medium and low speed. For example, wireless chips such as various narrowband power line carrier communication chips, Bluetooth, ZIGBEE, and the like each use the FSK modulation technology. The FSK modulation technology has two code elements: a mark frequency Fm and a space frequency Fs. The mark frequency Fm is used for representing a number "1", and the space frequency Fs is used for representing a number "0".

Figure 3:
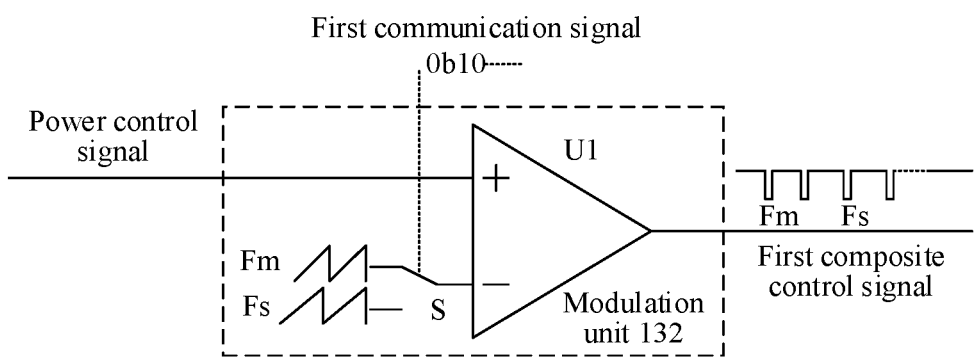
FIG. 3 is a block diagram of a modulation unit of a shutdown device according to a first embodiment of the present invention.

The present invention uses the FSK modulation technology as an example for description. FIG. 3 is a block diagram of a modulation unit 132. The modulation unit 132 includes a selection switch S and a first comparator U1. A first input terminal of the first comparator U1 receives a power control signal, a second input terminal is connected to the first terminal of the selection switch S, and an output terminal outputs the first composite control signal. A second terminal of the selection switch S receives a carrier signal of the mark frequency Fm, and a third terminal receives a carrier signal of the space frequency Fs. The first communication signal controls the selection switch S to select carrier signals of different frequencies. When a bit of the first communication signal is "1", the carrier signal of the mark frequency Fm is selected. When a bit of the first communication signal is "0", the carrier signal of the space frequency Fs is selected. The power control signal is compared with the carrier signal, to obtain the first composite control signal. The first composite control signal controls the switching device 1221 to work in the high-frequency switching state, and the frequency of the first composite control signal determines the frequency of the fundamental component of the output voltage Vo. Correspondingly, the frequency of the first composite control signal also determines the frequency of the fundamental component of the current ripple signal. The duty cycle of the first composite control signal determines the voltage ripple of the input/output voltage of the shutdown device, thereby indirectly controlling the output power of the photovoltaic module.

As an implementation of the present invention, the control module 13 further includes a monitoring unit 133, a comprehensive control unit 134, and a protocol processing unit 135. The monitoring unit 133 collects and obtains operating data of the shutdown device, and provides the operating data to the comprehensive control unit 134. The operating data of the shutdown device includes input and output electrical parameters and internal operating data of the shutdown device, where the input and output electrical parameters include an output voltage, an output current, and a power generation of a direct-current power supply coupled to each input port of the shutdown device, and an output voltage and a power bus current of the shutdown device, and the internal operating data includes a temperature, operating states, and alarm information of the shutdown device. The comprehensive control unit 134 packages the operating data of the shutdown device into a first data packet, and provides the first data packet to the protocol processing unit 135. The protocol processing unit 135 encapsulates the first data packet into the first communication signal according to a predetermined communication protocol, and provides the first communication signal to the modulation unit 132.

As an implementation of the present invention, the control module 13 further includes a drive unit 136, which is connected to the modulation unit 132, and generates a first drive signal according to the received first composite control signal. The first drive signal controls the switching of the switching device 1221.

As an implementation of the present invention, the shutdown device further includes a signal decoupling module 14. The signal decoupling module 14 is configured to separate a power line carrier signal on the power bus from the power bus current, to extract the power line carrier signal. The signal decoupling module 14 includes an RLC parallel resonant circuit. The RLC parallel resonant circuit is a band-pass filter. The frequency of the power line carrier signal is in the passband of the band-pass filter. The RLC parallel resonant circuit provides a stable impedance for a power line carrier signal, thereby extracting the power line carrier signal from a power line. The control module 13 further includes a demodulation unit 137, which receives the power line carrier signal extracted by the signal decoupling module 14, and filters and amplifies the power line carrier signal, to obtain a power line carrier signal with a better signal-to-noise ratio, and demodulates the power line carrier signal, to obtain a second communication signal, and provides the second communication signal to the protocol processing unit 135. The protocol processing unit 135 parses the received second communication signal to obtain a second data packet according to a protocol format, and provides the second data packet to the comprehensive control unit 134. The comprehensive control unit 134 parses the second data packet, to obtain control instructions in the second data packet, and adjusts operating modes of the shutdown device according to the control instructions of the shutdown device, where the control instructions of the shutdown device include a permission to operate instruction, a rapid shutdown instruction, and a data collection instruction. The operating mode of the shutdown device includes a safe disconnection mode and a normal operating mode. The protocol processing unit 135 further generates a data transmitting state signal, and provides the data transmitting state signal to the power control unit 131. The data transmitting state signal represents states of data transmitting by the shutdown device, including an idle state and a busy state. The power control unit 131 controls the switching of the switching device 1221 according to the data transmitting state signal and the operating mode of the shutdown device.

As an implementation of the present invention, an initial mode after the shutdown device is powered on is the safe disconnection mode, and when receiving the permission to operate instruction, the comprehensive control unit 134 switches the operating mode of the shutdown device to the normal operating mode. When the comprehensive control unit 134 does not receive the permission to operate instruction within a first preset time period, or receives the rapid shutdown instruction, the comprehensive control unit switches the operating mode of the shutdown device to the safe disconnection mode.

As an implementation of the present invention, when the shutdown device is in the normal operating mode, if the comprehensive control unit 134 receives the data collection instruction, the comprehensive control unit 134 packages the operating data of the shutdown device into the first data packet, and the protocol processing unit 135 encapsulates the first data packet into the first communication signal, provides the first communication signal to the modulation unit 132, and sets the data transmitting state signal to represent a busy state. The power control unit 131 adjusts the amplitude of the power control signal according to the power bus current, thereby adjusting the duty cycle of the first composite control signal. The modulation unit 132 modulates the first communication signal and the power control signal, to generate the first composite control signal. In this case, the first composite control signal controls the switching device 1221 to work in the high-frequency switching state, to generate the current ripple signal carrying the operating data of the shutdown device on the power bus. When the transmitting of the first data packet is completed, the protocol processing unit 135 sets the data transmitting state signal to represent an idle state, the power control unit 131 adjusts the power control signal to a first preset value, and in this case, the first composite control signal controls the switching device 1221 to be in an always-on state. When the shutdown device is in the safe disconnection mode, the power control unit 131 adjusts the power control signal to a second preset value, and in this case, the first composite control signal controls the switching device 1221 to be in an off state.

As an implementation of the present invention, when the shutdown device is in the safe disconnection mode, the modulation unit 132 outputs a low-level first composite control signal, to control the switching device 1221 to be in an off state, and the output voltage and power of the shutdown device are in a controlled safe state. When the shutdown device is in the normal operating mode and the data transmitting state signal represents an idle state, the modulation unit 132 outputs a high-level first composite control signal, to control the switching device 1221 to be in an always-on state. When the shutdown device is in the normal operating mode and the data transmitting state signal represents a busy state, the modulation unit 132 outputs the modulated first composite control signal, and the first composite control signal controls the switching device 1221 to be in the high-frequency switching state. The power control signal adjusts the duty cycle of the first composite control signal according to the power bus current, to control the fluctuation range of an operating point of the photovoltaic module, so that a peak value of a voltage ripple at the input port of the shutdown device kept within a predetermined ripple threshold, and a drop amplitude in the output power of the photovoltaic module caused by the voltage ripple at the input port of the shutdown device in the high-frequency switching state of the switching device 1221 is reduced.

When the shutdown device is in the safe disconnection mode, the same as the conventional shutdown device, the switching device 1221 is in the off state, and the photovoltaic module accessing the input port 10 is disconnected from the power bus. The output of the photovoltaic module is in an open circuit state, the output power is close to zero, and the output voltage and power of the shutdown device are limited. When the shutdown device is in the normal operating mode and the switching device 1221 is in the always-on state, the output voltage of the shutdown device is equal to its input voltage. The output power of the shutdown device is equal to the output power of the photovoltaic module. The output power of the photovoltaic module is adjusted by the power bus current. The power bus current is controlled by the photovoltaic inverter accessing the power bus. When the shutdown device is in the normal operating mode and the switching device 1221 is in the high-frequency switching state, the operating data of the shutdown device is coupled to the power bus, and the output power of the photovoltaic module is controlled by the power bus current and the duty cycle of the first composite control signal.

As an implementation of the present invention, the shutdown device further includes a discharge module 15. When the shutdown device switches from the normal operating mode to the safe disconnection mode, the comprehensive control unit 134 turns on the discharge module 15, providing a discharge path, and quickly discharges the power bus to keep its voltage below a safe value within a specified time period. In other words, the output voltage of the power bus is decreased to below 30V within 30 seconds, to meet the requirement of North American national electrical code NEC2017. The discharge current through the discharge path generally ranges from 5 to 10 mA. When the shutdown device switches from the safe disconnection mode to the normal operating mode, the comprehensive control unit 134 turns off the discharge module 15, and break the discharge path.

When the photovoltaic inverter in the photovoltaic system is in a standby mode, the power bus current may be extremely low, such as less than 1 mA. According to Formula (2) and parameters of a specific embodiment of the present invention, when the input voltage Vin of the shutdown device is 40V, the power bus current is 1 mA, and the duty cycle D is 0.5, the drop voltage ΔVo of the output voltage Vo is 5 mV. By performing fourier transformation on the waveform of the output voltage Vo, it can be seen that the amplitude of the fundamental component is 1.9 mV, and the amplitude of the fundamental current ripple on the power bus is 19 uA. The amplitude of the power line carrier signal generated on the power bus is too low, leading to the shutdown device communication failure. Therefore, when the power bus current is less than a specific value, there will be a signal transmitted by the shutdown device, which is the current ripple signal coupled to the power bus, with a too small amplitude, making the main controller to be unable to receive the operating data transmitted by the shutdown device. In this case, the present invention provides an implementation, when the shutdown device transmits the first data packet, if the power bus current is less than a current threshold, the discharge module 15 is turned on, and a discharge current through the output unit of the shutdown module is increased, to enhance the amplitude of the current ripple signal. For example, the discharge module 15 may be turned on, to additionally provide an output current ranging from 5 to 10 mA to the shutdown device. When the duty cycle D is still 0.5, the fundamental current ripple on the power bus increases 5 to 10 times, reaching 114 uA to 209 uA. The amplitude of the power line carrier signal is greatly improved, improving the success rate of communication. When the transmitting of the first data packet is completed, the discharge module 15 is controlled to be turned off.

As an implementation of the present invention, the shutdown device further includes a bypass device, which is connected in parallel to the output unit 123, and forms a switch unit 122 with the switching device 1221. When the photovoltaic module is blocked, and the control module or the photovoltaic module fails, a bypass path is provided for the power bus current. The bypass device may be implemented by a diode.

Because the shutdown device supplies power to the control module 13 by using an auxiliary power from the photovoltaic module corresponding to the input port 10, when the shutdown device is in the normal operating mode, and the maximum output current of the photovoltaic module is less than the power bus current, for example, working conditions such as the photovoltaic module is blocked by shadows and dust, or has a great attenuation, the output voltage of the photovoltaic module is gradually pulled down to zero, causing the supply of auxiliary power to be interrupted and the control module 13 to be powered off. To prevent the control module 13 from being powered off, the switching device 1221 is usually turned off, and the power bus current flows through the bypass device of the switch unit 122. Under the working condition, that is, when the input state of the input port of the shutdown device is abnormal, the operating data of the shutdown device cannot be coupled to the power bus through the high-frequency switching of the switching device 1221. To implement the data transmitting function of the shutdown device, the present invention performs improvement based on the first embodiment, and proposes a shutdown device of the second embodiment. Compared with the shutdown device of the first embodiment of the present invention, the bypass device of the shutdown module 12 is implemented by a switching device, for example, IGBT, MOSFET, and the like. When the photovoltaic module is blocked by shadows and dust, or has a great attenuation, causing the maximum output current of the photovoltaic module to be less than the power bus current, communication data such as the operating data of the shutdown device is coupled to the power bus by the high-frequency switching of the bypass device, to implement the communication transmitting function of the shutdown device.

Figure 4:
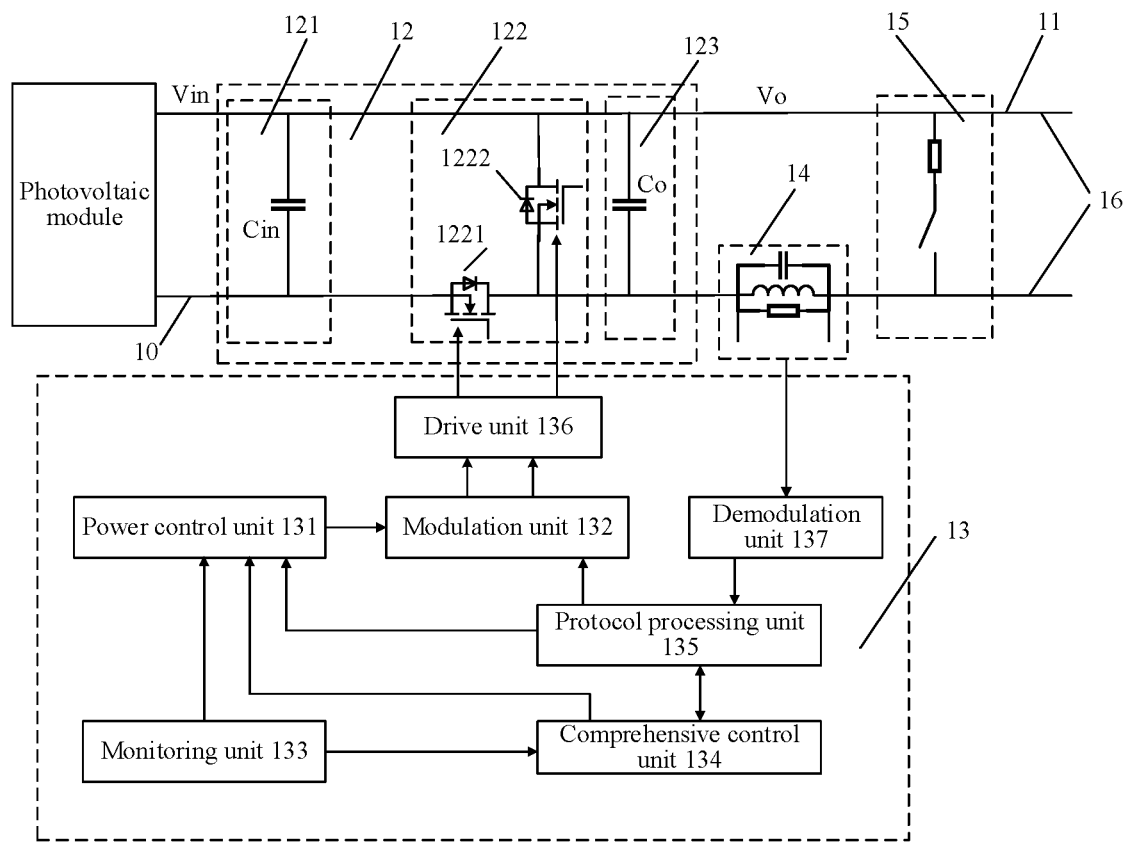
FIG. 4 is a system block diagram of a shutdown device according to a second embodiment of the present invention.

FIG. 4 is a system block diagram of a shutdown device according to a second embodiment of the present invention. The bypass device 1222 is a switching device, to provide a bypass path for the power bus current. The control module 13 modulates a freewheeling control signal and the first communication signal, to generate a second composite control signal when the input state of the input port of the shutdown device is abnormal, and the second composite control signal controls the bypass device 1222 to work in the high-frequency switching state, to superimpose the current ripple signal including the first communication signal onto the power bus, where the freewheeling control signal is used to control the switching of the bypass device 1222.

As an implementation of the present invention, the monitoring unit 133 monitors the input voltage Vin of the shutdown device, and outputs an input state detection signal to the power control unit 131. The power control unit 131 generates the freewheeling control signal according to the input state detection signal, the operating mode of the shutdown device, and the data transmitting state signal. The power control unit 131 further generates the power control signal according to the input state detection signal, the operating mode of the shutdown device, the data transmitting state signal, and the power bus current. The amplitude of the power control signal is correlate with the power bus current, and the freewheeling control signal is a set value. The modulation unit 132 modulates the power control signal and the first communication signal to generate the first composite control signal, and modulates the freewheeling control signal and the first communication signal to generate the second composite control signal. The duty cycle of the first composite control signal is determined by the power bus current, and the duty cycle of the second composite control signal is a predetermined value. The drive unit 136 deals with the first composite control signal and the second composite control signal respectively, to obtain a first drive signal and a second drive signal. The first drive signal controls the switching device 1221, and the second drive signal controls the bypass device 1222.

As an implementation of the present invention, when detecting that the input voltage Vin of the shutdown device is less than a voltage threshold, the monitoring unit 133 determines that the input state of the input port 10 of the shutdown device is abnormal, otherwise determines that the input state of the input port 10 of the shutdown device is normal. When the input state of the input port 10 of the shutdown device is abnormal, the power control unit 131 outputs the power control signal to control the switching device 1221 to be in an off state, and outputs the freewheeling control signal to control the bypass device 1222 to be in an always-on state or a high-frequency switching state. After a second preset time period, the power control signal output by the power control unit 131 controls the switching device 1221 to be turned on, and the output freewheeling control signal controls the bypass device 1222 to be turned off. For example, the second preset time period is set to 5 mins. When the input voltage Vin of the shutdown device is greater than a threshold voltage for more than a third preset time period, the input state of the input port 10 of the shutdown device is switched to a normal state, otherwise the input state of the input port 10 of the shutdown device remains abnormal. For example, the third preset time period is set to 100 ms.

As an implementation of the present invention, an initial operating mode after the shutdown device is powered on is the safe disconnection mode, and when receiving the permission to operate instruction, the comprehensive control unit 134 switches the operating mode of the shutdown device to the normal operating mode. When the comprehensive control unit 134 does not receive the permission to operate instruction within a first preset time period, or receives the rapid shutdown instruction, the comprehensive control unit switches the operating mode of the shutdown device to the safe disconnection mode. When the shutdown device is in the normal operating mode, if the comprehensive control unit 134 receives the data collection instruction, the comprehensive control unit packages the operating data of the shutdown device into the first data packet and provides the first data packet to the protocol processing unit 135. The protocol processing unit 135 encapsulates the first data packet into the first communication signal, provides the first communication signal to the modulation unit 132, and sets the data transmitting state signal to represent a busy state. In this case, if the input state of the input port 10 of the shutdown device is normal, the power control unit 131 adjusts the amplitude of the power control signal according to the power bus current. The modulation unit 132 modulates the first communication signal and the power control signal into the first composite control signal. The first composite control signal controls the switching device 1221 to work in a high-frequency switching state, and the second composite control signal controls the bypass device 1222 to be in an off state. When the transmitting of the first data packet is completed, the protocol processing unit 135 sets the data transmitting state signal to represent an idle state, the power control unit 131 adjusts the power control signal to a first preset value, in this case, the first composite control signal controls the switching device 1221 to be in an always-on state, and the second composite control signal controls the bypass device 1222 to remain in the off state; if the input state of the input port 10 of the shutdown device is abnormal, the modulation unit 132 modulates the first communication signal and the freewheeling control signal to generate the second composite control signal, the second composite control signal controls the bypass device 1222 to work in the high-frequency switching state, and the first composite control signal controls the switching device 1221 to be in an off state; and when the transmitting of the first data packet is completed, the second composite control signal controls the state of the bypass device 1222 to switch to the always-on state. When the operating mode of the shutdown device is the safe disconnection mode, the first composite control signal controls the switching device 1221 to be in an off state, and the second composite control signal controls the bypass device 1222 to be in an off state.

When the input state of the input port 10 of the shutdown device is abnormal, the second composite control signal controls the bypass device 1222 to work in the high-frequency switching state, a corresponding fundamental component of the output voltage is generate at the output port 11 of the shutdown device. Under the excitation of the fundamental component of the output voltage, a corresponding fundamental current ripple is generated on the power bus, thereby coupling the first communication signal containing operating data to the power bus, generating the current ripple signal carrying operating data on the power bus, and implementing an objective of data transmitting by the shutdown device. The principle is the same as that of the first embodiment of the present invention. This is not repeated herein. When the input state of the input port 10 of the shutdown device is normal, data is transmitted by using the switching device 1221. The principle is the same as that of the first embodiment. This is not repeated herein.

When the shutdown device is in the safe disconnection mode, the switching device 1221 and the bypass device 1222 are in an off state, and the photovoltaic module accessing the input port 10 is disconnected from the power bus. The output of the photovoltaic module is in an open circuit state, the output power is close to zero, and the output voltage and power of the shutdown device are limited. When the shutdown device is in the normal operating mode and the input state of the input port 10 of the shutdown device is normal, the switching device 1221 is in the always-on state or the high-frequency switching state, the bypass device 1222 is in the off state, and the photovoltaic module connected to the input port 10 is connected to the power bus. The output power of the photovoltaic module is controlled by the power bus current and the duty cycle of the first composite control signal. When the shutdown device is in the normal operating mode and the input state of the input port 10 of the shutdown device is abnormal, the switching device 1221 is in the off state, the photovoltaic module accessing the input port 10 is disconnected from the power bus, the bypass device 1222 is in an on state, and the power bus current passes through the bypass device 1222. When the shutdown device transmits data, the bypass device 1222 is in the high-frequency switching state, and couples the operating data that needs to be transmitted by the shutdown device to the power bus.

As an implementation of the present invention, the switching device 1221 may be located between a high electric potential terminal of the input port 10 and a high electric potential terminal of the output port 11, or between a low electric potential terminal of the input port 10 and a low electric potential terminal of the output port 11. This implementation is described by using an example in which the switching device 1221 is located between a low electric potential terminal of the input port 10 and a low electric potential terminal of the output port 11.

Figure 5:
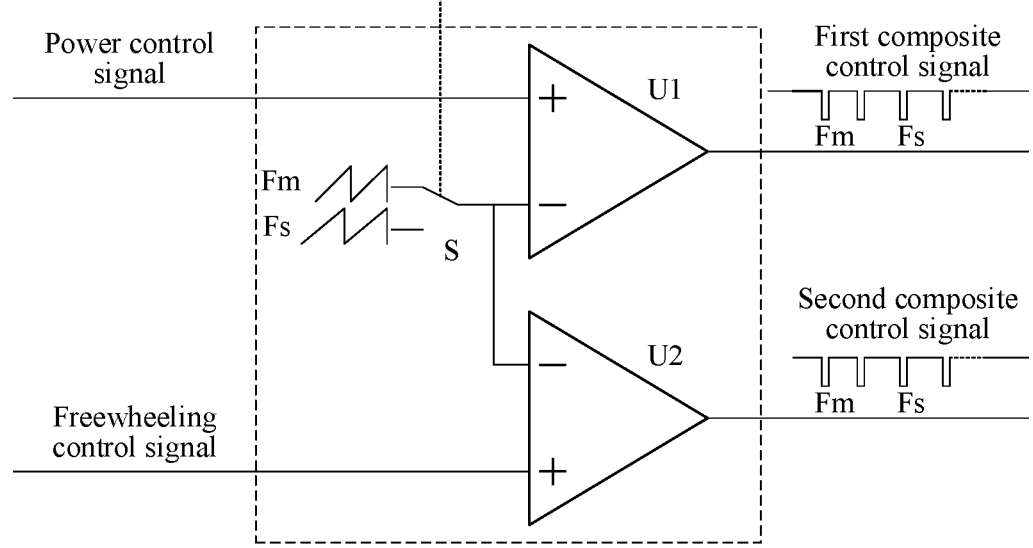
FIG. 5 is a block diagram of a modulation unit of a shutdown device according to the second embodiment of the present invention.

FIG. 5 is a block diagram of a modulation unit 132 of a shutdown device according to the second embodiment of the present invention. The modulation unit 132 includes a selection switch S, a first comparator U1, and a second comparator U2. A first input terminal of the first comparator U1 receives a power control signal, a second input terminal is connected to a first terminal of the selection switch S, and an output terminal of the first comparator U1 outputs a first composite control signal. A first input terminal of the second comparator U2 receives a freewheeling control signal, a second input terminal is connected to the first terminal of the selection switch S, and an output terminal of the second comparator U2 outputs a second composite control signal. A second terminal of the selection switch S receives a carrier signal of the mark frequency Fm, and a third terminal receives a carrier signal of the space frequency Fs. The first communication signal controls the selection switch S to select carrier signals of different frequencies. When the bit of the first communication signal is "1", the carrier signal of the mark frequency Fm is selected. When the bit of the first communication signal is "0", the carrier signal of the space frequency Fs is selected. The power control signal is compared with the carrier signal, to obtain the first composite control signal; and The freewheeling control signal is compared with the carrier signal, to obtain the second composite control signal. When the input state of an input port 10 of the shutdown device is normal, the first composite control signal may control the switching device 1221 to work in the high-frequency switching state, and the second composite control signal controls the bypass device 1222 to be in an off state. The duty cycle of the first composite control signal determines the voltage ripple of an input/output voltage, thereby indirectly controlling the output power of the photovoltaic module. When the input state of the input port 10 of the shutdown device is abnormal, the first composite control signal controls the switching device 1221 to be in the off state, and the second composite control signal controls the bypass device 1222 to be in an always-on state or a high-frequency switching state. When the bypass device works in the high-frequency switching state, the duty cycle of the second composite control signal is set to 50%.

In summary, when the abnormal output of the photovoltaic module connected to the input port of the shutdown device causes a maximum output current of photovoltaic module shutdown to be less than a power bus current, and when the switching device of the shutdown module is turned off, in this embodiment, through modulation and control of the bypass device of the shutdown device, and the bypass device is controlled to work in the high-frequency switching state, thereby implementing data transmitting of the shutdown device under an abnormal working condition, and improving environmental suitability of the shutdown device.

The present invention provides a communication method for a shutdown device, which may be applied to the above-mentioned shutdown device. However, the invention is not limited to the example. The communication method for embodiments of the present invention may be applied to any other shutdown device to which the present invention may be applied. The communication method for a shutdown device includes:

modulating a power control signal and a first communication signal, to generate a first composite control signal, where the power control signal is used to adjust an output power of a direct-current power supply coupled to an input port 10 of the shutdown device; and
controlling a switching device 1221 of the shutdown device to work in a high-frequency switching state by the first composite control signal, to superimpose a current ripple signal including the first communication signal onto a power bus.

The operating data of the shutdown device is collected and obtained, the operating data of the shutdown device is packaged into a first data packet, and the first data packet is encapsulated into the first communication signal according to a predetermined communication protocol. The shutdown device generates the power control signal according to the power bus current, and modulates the first communication signal and the power control signal, to generate the first composite control signal. The first composite control signal controls the switching device 1221 to perform a high-frequency switching. By the high-frequency switching of the switching device 1221 under the control of the first composite control signal, a corresponding fundamental component of the output voltage is generated at an output port of the shutdown device, and under the excitation of the fundamental component of the output voltage, a corresponding fundamental current ripple is generated on the power bus, in other words, a current ripple signal carrying operating data is generated on the power bus, to implement a data transmitting function of the shutdown device.

As an implementation of the present invention, an amplitude of the power control signal is adjusted according to a power bus current of the shutdown device, and a duty cycle of the first composite control signal is further controlled, to keep a peak value of a voltage ripple at the input port of the shutdown device within a predetermined ripple threshold.

As an implementation of the present invention, the duty cycle of the first composite control signal is positively correlate with the power bus current, the larger the power bus current is, the larger the duty cycle is, and conversely, the smaller the duty cycle is.

As an implementation of the present invention, the communication method further includes:
providing a freewheeling control signal, where the freewheeling control signal is used to control the switching of a bypass device of the shutdown device; and
when an input state of the input port 10 of the shutdown device is abnormal, the first composite control signal controls the switching device 1221 to be off, the freewheeling control signal and the first communication signal are modulated, to generate a second composite control signal, and the second composite control signal controls the bypass device 1222 to work in a high-frequency switching state, to superimpose the current ripple signal including the first communication signal onto the power bus.

When the shutdown device is in the normal operating mode, if it is monitored that the input voltage of the shutdown device is less than the voltage threshold, it is determined that the input state of the input port of the shutdown device is abnormal. When the first data packet needs to be transmitted, the first communication signal and the freewheeling control signal are modulated to generate the second composite control signal. The second composite control signal controls the bypass device 1222 to work in the high-frequency switching state, and the first composite control signal controls the switching device 1221 to be in an off state. A corresponding fundamental component of the output voltage is generated on the output port 11 of the shutdown device, and a corresponding fundamental current ripple is generated on the power bus, thereby coupling the first communication signal containing the operating data of the shutdown device to the power bus, and implementing an objective of data transmitting to the outside by the shutdown device when the input port is abnormal. When the transmitting of the first data packet is completed, the second composite control signal controls the state of the bypass device 1222 to switch to an always-on state.

Figure 6:
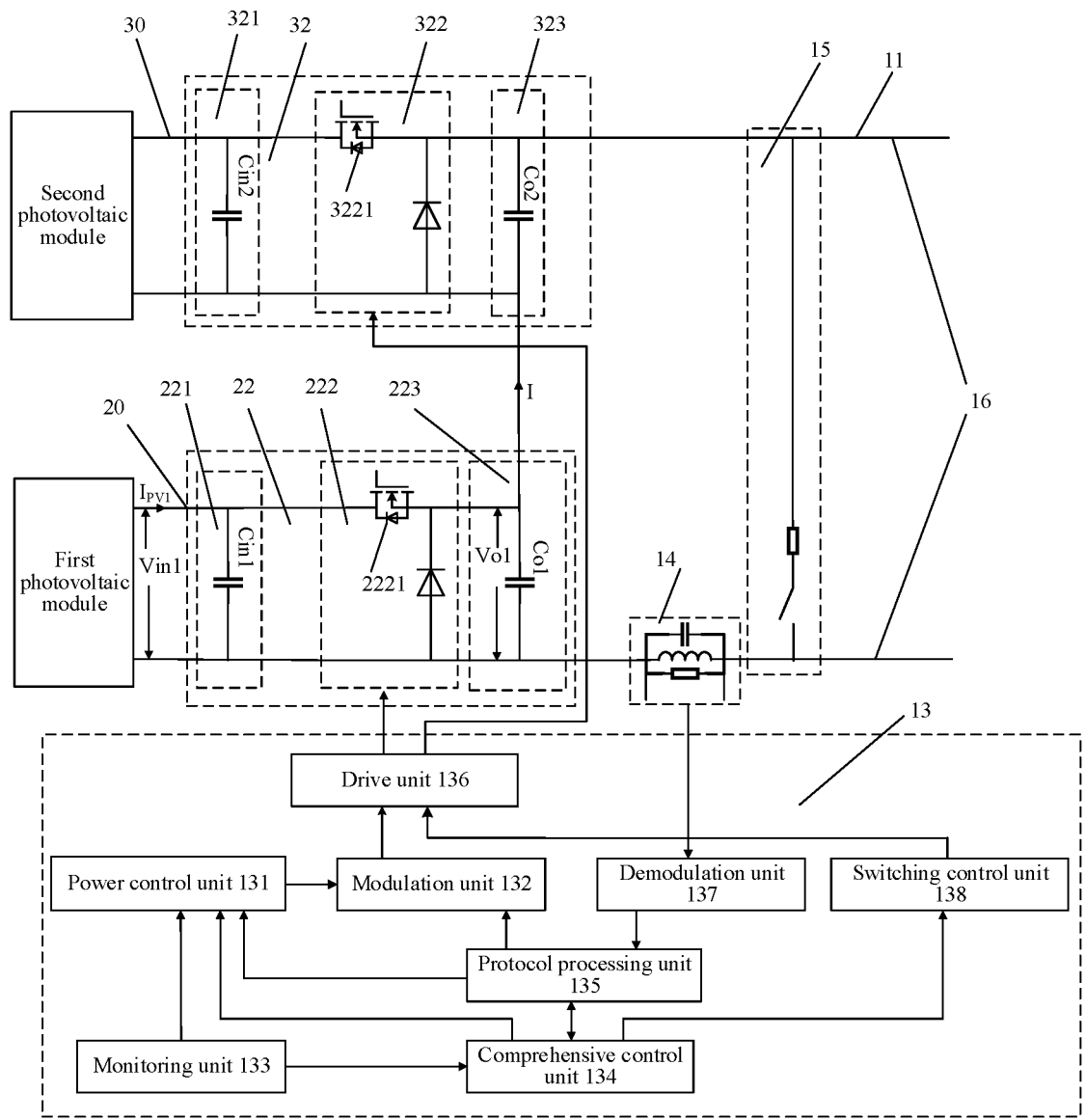
FIG. 6 is a system block diagram of a shutdown device according to a third embodiment of the present invention.

FIG. 6 is a system block diagram of a shutdown device according to a third embodiment of the present invention. The shutdown device includes:
a first input port 20, configured to be coupled to a first direct-current power supply;
at least one second input port 30, configured to be coupled to a second direct-current power supply;
an output port 11, configured to be coupled to a power bus;
a first shutdown module 22, connected to the first input port 20, where the first shutdown module 22 includes a first switching device 2221, and the first switching device 2221 is configured to control an output power of the first direct-current power supply coupled to the first input port 20;
at least one second shutdown module 32, connected to the second input port 30, where the second shutdown module 32 includes a second switching device 3221, and the second switching device 3221 is configured to control an output power of the second direct-current power supply coupled to the second input port 30, where
the first shutdown module 22 and the second shutdown module 32 are connected in series and are connected to the output port 11;
a control module 13, configured to modulate a power control signal and a first communication signal, to generate a first composite control signal, where the power control signal adjusts the output power of the first direct-current power supply coupled to the first input port 20, and the first composite control signal controls the first switching device 2221 to work in a high-frequency switching state, to superimpose a current ripple signal including the first communication signal onto the power bus; and
the control module 13 being further configured to generate a switching control signal, to control a switching of the second switching device 3221.

The first shutdown module 22 further includes a first input unit 221 coupled to the first input port 20 and a first output unit 223 coupled to the output port 11. The first input unit 221 includes a first input capacitor Cin1, used to stabilize an input voltage Vin1 of the first input port 20 of the shutdown device. The first shutdown module 22 further includes a bypass device, which is connected in parallel to the first output unit 223, and forms a first switch unit 222 with the first switching device 2221. The first output unit 223 includes a first output capacitor Co1, used to stabilize an output voltage of the shutdown device. The second shutdown module 32 further includes a second input unit 321 coupled to the second input port 30 and a second output unit 323 coupled to the output port 11. The second input unit 321 includes a second input capacitor Cin2, used to stabilize an input voltage Vin2 of the second input port 30 of the shutdown device. The second shutdown module 32 further includes a bypass device, which is connected in parallel to the second output unit 323, and forms a second switch unit 322 with the second switching device 3221. The second output unit 323 includes a second output capacitor Co2, used to stabilize an output voltage of the shutdown device. The second shutdown module 32 is connected in series to a high electric potential output terminal or a low electric potential output terminal of the first shutdown module 22. This application provides a description by using an example of the second shutdown module 32 connected in series to the high electric potential output terminal of the first shutdown module 22. An operating mode of the first shutdown module 22 is the same as an operating mode of the shutdown module of the shutdown device in the first embodiment. The similarities are not described again, and only the differences will be introduced herein.

As an implementation of the present invention, the control module 13 further includes a switching control unit 138, configured to generate a switching control signal that controls the switching of the second switching device 3221 according to an operating mode of the shutdown device. The working state of the second switching device 3221 includes an off state and an always-on state. The operating mode of the shutdown device includes a safe disconnection mode and a normal operating mode.

An initial operating mode after the shutdown device is powered on is the safe disconnection mode, and when receiving the permission to operate instruction, the comprehensive control unit 134 switches the operating mode of the shutdown device to the normal operating mode. When the comprehensive control unit 134 does not receive the permission to operate instruction within a first preset time period, or receives the rapid shutdown instruction, the comprehensive control unit switches the operating mode of the shutdown device to the safe disconnection mode.

As an implementation of the present invention, when the shutdown device is in the normal operating mode, if the comprehensive control unit 134 receives the data collection instruction, the comprehensive control unit 134 packages the operating data of the shutdown device into the first data packet and provides the first data packet to the protocol processing unit 135, and the protocol processing unit 135 encapsulates the first data packet into the first communication signal, and sets the data transmitting state signal to represent a busy state. The power control unit 131 adjusts the amplitude of the power control signal according to the power bus current. The modulation unit 132 modulates the first communication signal and the power control signal, to generate the first composite control signal. In this case, the first composite control signal controls the first switching device 2221 to work in the high-frequency switching state, and the switching control signal controls the second switching device 3221 to be in the always-on state. When the transmitting of the first data packet is completed, the protocol processing unit 135 sets the data transmitting state signal to represent an idle state, the power control unit 131 adjusts the power control signal to a first preset value, in this case, the first composite control signal controls the first switching device 2221 to be in an always-on state, and the switching control signal controls the second switching device 3221 to remain in the always-on state. When the shutdown device is in the safe disconnection mode, the power control unit 131 adjusts the power control signal to a second preset value, in this case, the first composite control signal controls the first switching device 2221 to be in an off state, and the switching control signal controls the second switching device 3221 to be in an off state.

When the shutdown device is in the safe disconnection mode, the first switching device 2221 and the second switching device 3221 are in an off state, the photovoltaic module accessing the first input port 20 is disconnected from the power bus, and the photovoltaic module accessing the second input port 30 is disconnected from the power bus. The output of the photovoltaic module is in an open circuit state, the output power is close to zero, and the output voltage and power of the shutdown device are limited. When the shutdown device is in the normal operating mode, the first switching device 2221 is in the always-on state or the high-frequency switching state, the second switching device 3221 is in the always-on state, the photovoltaic module accessing the first input port 20 is connected to the power bus, and the photovoltaic module accessing the second input port 30 is connected to the power bus. The output power of the photovoltaic module accessing the first input port 20 is controlled by both the power bus current and the duty cycle of the first composite control signal. The output power of the photovoltaic module accessing the second input port 30 is controlled by the power bus current.

As an implementation of the present invention, the first switching device 2221 may be located between a high electric potential terminal of the first input port 20 and a high electric potential terminal of the output port 11, or may be located between a low electric potential terminal of the first input port 20 and a low electric potential terminal of the output port 11. The second switching device 3221 may be located between a high electric potential terminal of the second input port 30 and a high electric potential terminal of the output port 11, or may be located between a low electric potential terminal of the second input port 30 and a low electric potential terminal of the output port 11. This implementation is described by using an example in which the first switching device 2221 is located between a high electric potential terminal of the first input port 20 and a high electric potential terminal of the output port 11 and the second switching device 3221 is located between a high electric potential terminal of the second input port 30 and a high electric potential terminal of the output port 11.

The shutdown device in this embodiment includes a plurality of input ports, which is a multi-input topology, and may select a switching device corresponding to any input port to work in the high-frequency switching state, for coupling the operating data of the shutdown device to the power bus to perform data transmitting. A plurality of switching devices share one control module, which may improve the integration level and power density of the shutdown device, and significantly reduce the production cost of a product.

As shown in FIG. 6, in the shutdown device of the third embodiment, the shutdown device is connected to a plurality of photovoltaic modules. When the shutdown device performs data transmitting and the first photovoltaic module connected to the first shutdown module 22 that transmits data is normal, the power bus current is equal to the output current of the first photovoltaic module, and the duty cycle of the first composite control signal is adjusted according to the power bus current. However, when the first photovoltaic module is abnormal, for example, susceptible to conditions such as being blocked by shadows and dust, or having a great attenuation, causing the output current of the first photovoltaic module to be less than the power bus current, the output voltage of the first photovoltaic module is short-circuited to zero. If a duty cycle control solution the same as the foregoing embodiment is used, the amplitude of the power line carrier signal generated on the power bus is relatively weak, resulting in data transmitting failure. Details will be described below.

A principle of the shutdown device transmitting the first communication signal through the high-frequency switching of the first switching device 2221 is described as follows. When the first photovoltaic module is normal, and the first switching device 2221 operates in the high-frequency switching state, during the off process of the first switching device 2221 switching device, an output current $I_{PV1}$ of the first photovoltaic module charges the first input capacitor Cin1, and the input voltage Vin1 across the first input capacitor Cin1 is raised. The output current $I_{PV1}$ of the first photovoltaic module is equal to the power bus current I. The input voltage Vin1 of the first shutdown module 22 rises linearly in this period, and an overcharge voltage $\Delta Vin1$ of the first shutdown module 22 is shown in Formula (3):

$$\Delta Vin1 = (I \cdot (1-D) \cdot T)/C_{in1}, \quad (3)$$

I is the power bus current, T is the cycle of the first composite control signal, D is the duty cycle of the first composite control signal, and $C_{in1}$ is the capacitance of first input capacitor Cin1.

The output voltage Vo1 of the first shutdown module 22 drops linearly, and the drop voltage ΔVo1 is as shown in Formula (4):

$$\Delta Vol = (I \cdot (1-D) \cdot T)/C_{o1}, \quad (4)$$

where $C_{o1}$ is the capacitor value of the second output capacitor Co1.

When the first switching device 2221 is on, energy stored in the first input capacitor Cin1 in the off process of the first switching device 2221 is quickly transferred to the first output capacitor Co1 through the first switching device 2221, thereby balancing the energy discharged by the first output capacitor Co1 in the off process of the first switching device 2221. In addition, the input voltage Vin1 and the output voltage Vo1 of the first shutdown module 22 return to a steady-state voltage. The output voltage Vo of the shutdown device is a sum of the output voltage Vo1 of the first shutdown module 22 and the output voltage Vo2 of the second shutdown module 32, when the first switching device 2221 works in a high-frequency switching state, the output voltage Vo of the shutdown device includes lots of high-frequency switching harmonics. By performing fourier transformation on the output voltage Vo, a direct-current component, a fundamental component, and other harmonic components of the output voltage Vo are obtained, where the frequency of the fundamental component is the switching frequency of the first switching device 2221. Under the excitation of the fundamental component of the output voltage Vo, a corresponding fundamental current ripple is generated on the power bus. According to the foregoing analysis, the fundamental component included in the output voltage of the shutdown device is modulated according to the first communication signal containing the operating data of the shutdown device, the power line carrier signal carrying the first communication signal may be injected into the power bus, and data transmitting of the shutdown device may be implemented. In this embodiment, the power line carrier signal is a fundamental component of a current ripple signal, namely, the fundamental current ripple.

Figure 7:
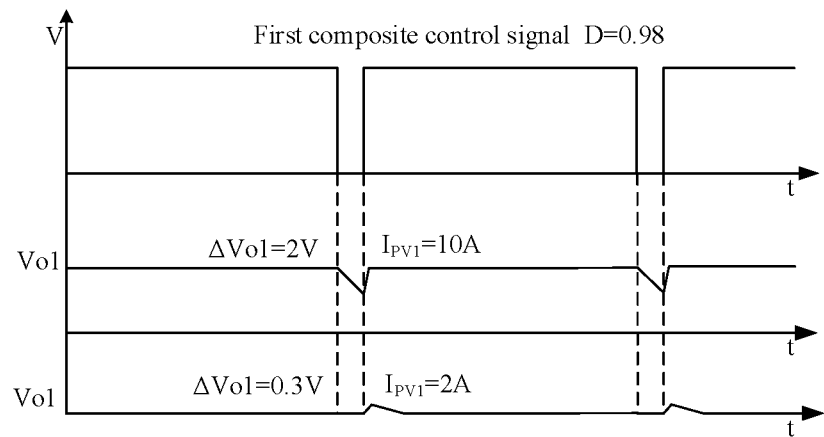
FIG. 7 is a waveform diagram of input and output voltages when a shutdown device performs data transmitting according to the third embodiment of the present invention.

Therefore, when the first photovoltaic module is normal, the duty cycle D of the first composite control signal is calculated according to the power bus current I, the first switching device 2221 performs a high-frequency switching under the control of the first composite control signal, causing a corresponding fundamental component of the output voltage to be generated at the output port 11 of the shutdown device. Under the excitation of the fundamental component of the output voltage, a corresponding fundamental current ripple is generated on the power bus, in other words, a current ripple signal carrying operating data is generated on the power bus, to implement a data transmitting function of the shutdown device. When the first photovoltaic module is abnormal, for example, susceptible to conditions such as being blocked by shadows and dust, or having a great attenuation, the output current $I_{PV1}$ of the first photovoltaic module will be less than the power bus current I, that is, when the input state of the first input port 20 of the shutdown device is abnormal, the bypass device is turned on, and the power bus current I separately flows through the first photovoltaic module and the bypass device. In this case, the input voltage Vin1 of the first shutdown module 22 is pulled down to 0, that is, if the duty cycle control solution in the foregoing embodiment is used, the amplitude of the power line carrier signal generated on the power bus is relatively weak, resulting in data transmitting failure. For example, as shown in FIG. 7, when T=1/100 kHz, the first output capacitor Co1 is 1 uF, and when the first photovoltaic module works normally, $I_{PV1}$=I=10 A, and duty cycle D=0.98. According to Formula (4), the drop voltage ΔVo1 of the output voltage Vo1 of the first shutdown module 22 is 2V. By performing fourier transformation on the waveform of the output voltage Vo, it can be seen that the amplitude of the fundamental component of the output voltage Vo is 38 mV. The fundamental component of the output voltage Vo generates a fundamental current ripple with an amplitude of 0.38 mA on the power bus. When the first photovoltaic module is abnormal, I is still 10 A, but the output current $I_{PV1}$ of the first photovoltaic module drops to 2 A. In this case, the drop voltage ΔVo1 is 0.3V, and the fundamental current ripple generated on the power bus is very weak, which may easily lead to data transmitting failure. Therefore, when the first photovoltaic module is abnormal, it is necessary to adjust the control strategy of the duty cycle of the first composite control signal during data transmitting. To improve the amplitude of the power line carrier signal coupled to the power bus when the photovoltaic module is abnormal, the present invention proposes a shutdown device in a fourth embodiment.

Figure 8:
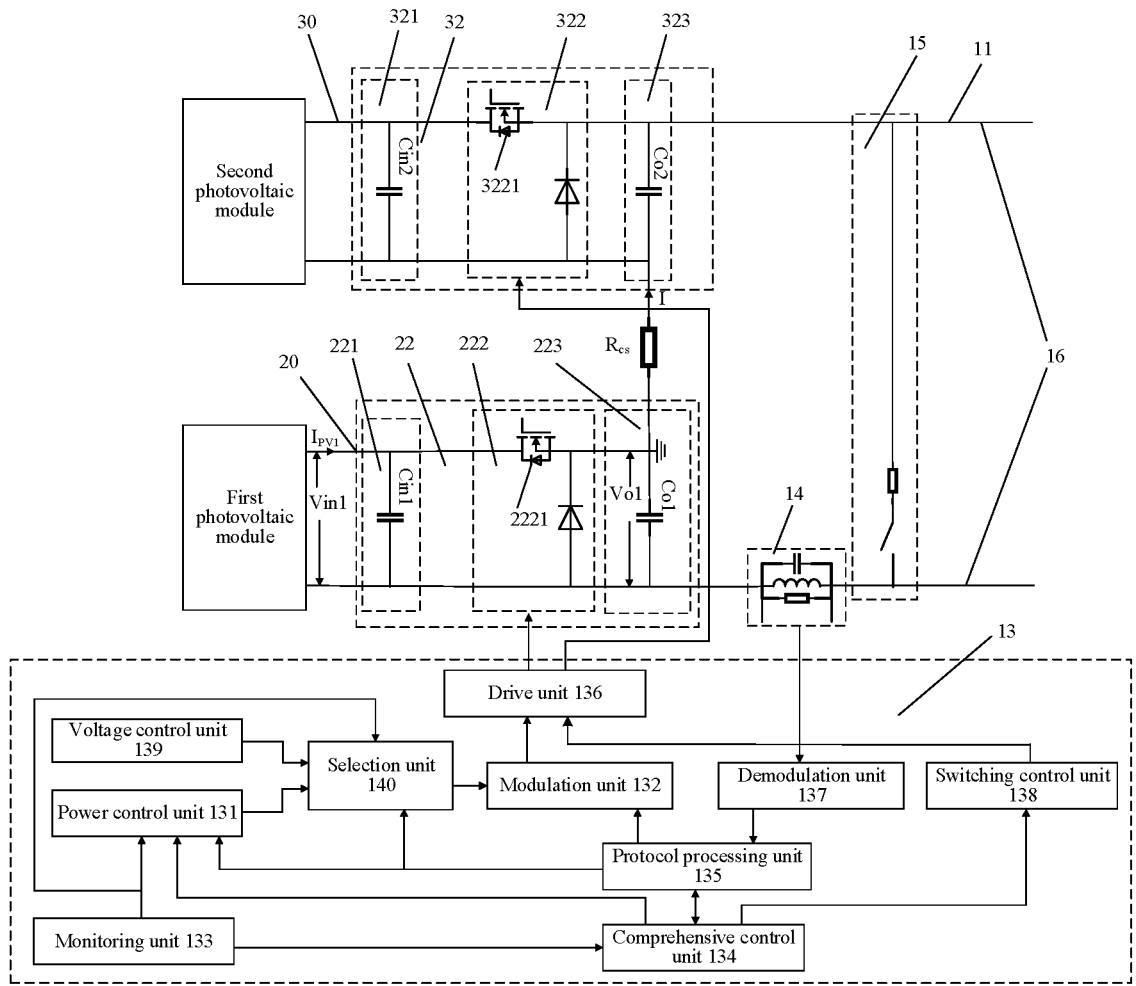
FIG. 8 is a system block diagram of a shutdown device according to a fourth embodiment of the present invention.

FIG. 8 is a system block diagram of a shutdown device according to a fourth embodiment of the present invention. In this embodiment, during data transmitting, the switching device 2221 is controlled to work in a high-frequency switching state through a first composite control signal, to superimpose a power line carrier signal onto a power bus. Compared with the third embodiment, the control module 13 further controls the duty cycle of the first composite control signal according to an input voltage Vin1 of the first shutdown module 22.

As an implementation of the present invention, when the input state of a first input port 20 of the shutdown device is abnormal, and during data transmitting, the control module 13 controls the duty cycle of the first composite control signal according to the input voltage Vin1 of the first shutdown module 22.

As an implementation of the present invention, the control module 13 further includes a voltage control unit 139 and a selection unit 140. The voltage control unit 139 generates a voltage control signal according to the input voltage Vin1 of the first shutdown module 22. The selection unit 140 is separately connected to the power control unit 131 and the voltage control unit 139, and selects to output the power control signal or the voltage control signal to the modulation unit 132 according to an input state detection signal and a data transmitting state signal of the first input port 20.

As an implementation of the present invention, when the input state detection signal represents that the input state of the first input port 20 is normal, the selection unit 140 selects to output the power control signal, and the modulation unit 132 modulates the first communication signal and the power control signal to generate the first composite control signal. When the input state detection signal represents that the input state of the first input port 20 is abnormal, and during data transmitting, the selection unit 140 selects to output the voltage control signal, the modulation unit 132 modulates the first communication signal and the voltage control signal to generate the first composite control signal. When data transmitting is completed, the selection unit 140 selects to output the power control signal, and the modulation unit 132 modulates the first communication signal and the power control signal to generate the first composite control signal.

As an implementation of the present invention, when the shutdown device is in the normal operating mode, if the comprehensive control unit 134 receives the data collection instruction, the comprehensive control unit 134 packages the operating data of the shutdown device into the first data packet and provides the first data packet to the protocol processing unit 135, and the protocol processing unit 135 encapsulates the first data packet into the first communication signal, and sets the data transmitting state signal to represent a busy state. When the input state of the first input port 20 of the shutdown device is normal, the power control unit 131 adjusts the amplitude of the power control signal according to the power bus current. The selection unit 140 selects to output the power control signal to the modulation unit 132. The modulation unit 132 modulates the first communication signal and the power control signal, to generate the first composite control signal. In this case, the first composite control signal controls the first switching device 2221 to work in the high-frequency switching state, and the switching control signal controls the second switching device 3221 to be in the always-on state. When the transmitting of the first data packet is completed, the protocol processing unit 135 sets the data transmitting state signal to represent an idle state, the power control unit 131 adjusts the power control signal to a first preset value, in this case, the first composite control signal controls the first switching device 2221 to be in an always-on state, and the switching control signal controls the second switching device 3221 to remain in the always-on state. When the shutdown device is in the safe disconnection mode, the power control unit 131 adjusts the power control signal to a second preset value, in this case, the first composite control signal controls the first switching device 2221 to be in an off state, and the switching control signal controls the second switching device 3221 to be in an off state.

As an implementation of the present invention, when the shutdown device is in the normal operating mode, if the comprehensive control unit 134 receives the data collection instruction, the comprehensive control unit 134 packages the operating data of the shutdown device into the first data packet and provides the first data packet to the protocol processing unit 135, and the protocol processing unit 135 encapsulates the first data packet into the first communication signal, and sets the data transmitting state signal to represent a busy state. When the input state of the first input port 20 of the shutdown device is abnormal, the voltage control unit 139 adjusts the amplitude of the voltage control signal according to the input voltage Vin1 of the first shutdown module 22, and the selection unit 140 selects to output the voltage control signal to the modulation unit 132. The modulation unit 132 modulates the first communication signal and the voltage control signal, to generate the first composite control signal. The first composite control signal controls the first switching device 2221 to work in the high-frequency switching state, and the switching control signal controls the second switching device 3221 to be in the always-on state. When the transmitting of the first data packet is completed, the protocol processing unit 135 sets the data transmitting state signal to represent an idle state, the selection unit 140 selects to output the power control signal to the modulation unit 132. The power control unit 131 adjusts the power control signal to the first preset value, in this case, the first composite control signal controls the first switching device 2221 to be in an always-on state, and the switching control signal controls the second switching device 3221 to remain in the always-on state. When the shutdown device is in the safe disconnection mode, the power control unit 131 adjusts the power control signal to the second preset value, in this case, the first composite control signal controls the first switching device 2221 to be in an off state, and the switching control signal controls the second switching device 3221 to be in an off state.

As an implementation of the present invention, when monitoring that the input voltage Vin1 of the first shutdown module 22 is less than a corresponding preset voltage threshold, the monitoring unit 133 determines that the input state of the first input port 20 of the shutdown device is abnormal, otherwise determines that the input state of the first input port 20 of the shutdown device is normal, and outputs the input state detection signal that represents the input state of the first input port 20.

As an implementation of the present invention, the duty cycle of the first composite control signal is controlled according to the input voltage Vin1 of a first shutdown module 22. When the peak value of the input voltage Vin1 of the first shutdown module 22 is greater than the preset first reference voltage, the duty cycle of the first composite control signal is increased, so that a peak value of a voltage ripple at the input port 20 of the shutdown device is kept within a predetermined ripple threshold; and when the peak value of the input voltage Vin1 of the first shutdown module 22 is less than the first reference voltage, the duty cycle of the first composite control signal is reduced, to increase the amplitude of the power line carrier signal, which meets the requirement of a signal amplitude during data transmitting, and prevents data transmitting failure.

As an implementation of the present invention, the duty cycle of the first composite control signal is controlled according to the input voltage Vin1 of a first shutdown module 22. When the average value of the input voltage Vin1 of the first shutdown module 22 is greater than the preset second reference voltage, the duty cycle of the first composite control signal is increased, so that a peak value of a voltage ripple at the input port 20 of the shutdown device is kept within a predetermined ripple threshold; and when the average value of the input voltage Vin1 of the first shutdown module 22 is less than the second reference voltage, the duty cycle of the first composite control signal is reduced, to increase the amplitude of the power line carrier signal, which meets the requirement of a signal amplitude during data transmitting, and prevents data transmitting failure.

As an implementation of the present invention, the voltage control unit 139 includes an error amplifier and a controller. The error amplifier is configured to obtain an amplified value of a difference between the input voltage Vin1 of the first shutdown module 22 and a reference voltage. The controller is configured to generate the voltage control signal according to the amplified value of the difference. The controller is, for example, a PI controller or a Bang-Bang controller. The reference voltage is a first reference voltage or a second reference voltage. The error amplifier calculates an amplified value of a difference between the peak value $\Delta V_{in1\_peak}$ of the input voltage Vin and the first reference voltage or an amplified value of a difference between the average value $V_{in1\_ave}$ of the input voltage Vin and the second reference voltage.

As an implementation of the present invention, a sampling resistor Rcs is connected in series between the output terminal of the second shutdown module 32 and the output terminal of the first shutdown module 22, and the power bus current I is obtained according to the voltage across the sampling resistor Rcs. In this embodiment, for simplicity of control, a connection point between the first shutdown module 22 and the sampling resistor Rcs serves as a common ground.

Figure 9:
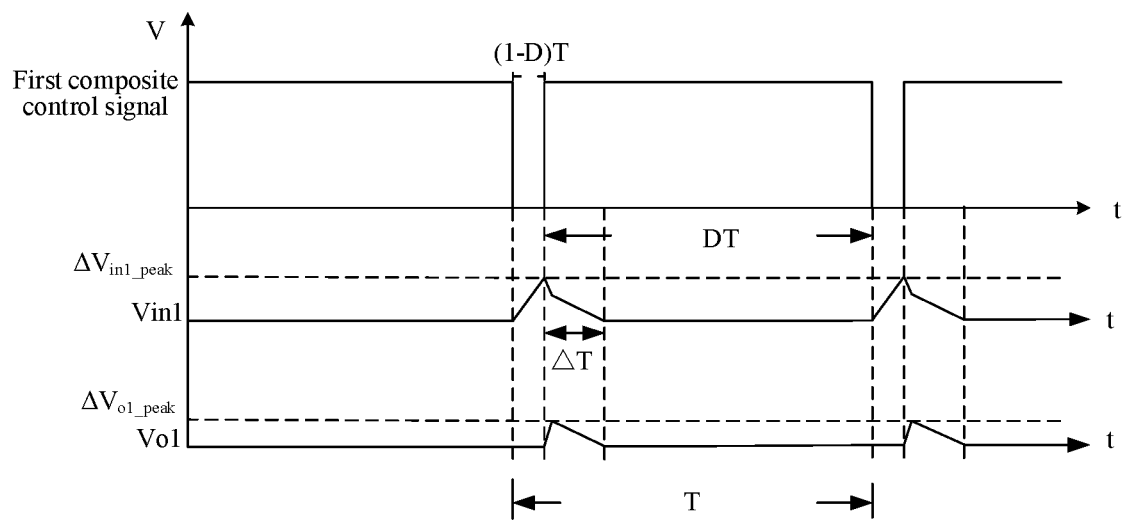
FIG. 9 is a waveform diagram of input and output voltages when a shutdown device performs data transmitting according to the fourth embodiment of the present invention.

A working principle of embodiments of the present invention is introduced below with reference to FIG. 9. FIG. 9 is a waveform diagram of input and output voltages when a first shutdown module of a shutdown device performs data transmitting according to an embodiment of the present invention. As shown in FIG. 9, when the first photovoltaic module is abnormal, during the off process of the first switching device 2221, the output current $I_{PV1}$ of the first photovoltaic module charges the first input capacitor Cin1, the input voltages Vin1 across the first input capacitor Cin1 raises linearly, and the overcharge voltage ΔVin1 is shown in Formula (3). When the first switching device 2221 is on, it is assumed that a part of energy on the first input capacitor Cin1 is transferred to the first output capacitor Co1 without loss during this on period, the drop voltage ΔVo1 on the first output capacitor Co1 is:

$$\Delta Vol = sqrt(C_{in1}/(C_{o1} + C_{in1})) * \Delta Vin1. \quad (5)$$

It may be learnt from the foregoing analysis that the amplitude of a current ripple signal is correlate with the output current $I_{PV1}$ of the first photovoltaic module, that is, correlate with the input current $I_{PV1}$ of the first shutdown module 22. The duty cycle of the first composite control signal may be adjusted according to the input current of the first shutdown module 22. In other words, the duty cycle is calculated according to the input current of the first shutdown module 22.

In practical application, the input current of the first shutdown module 22 is not easy to detect. According to voltage and current characteristics of the photovoltaic module, it is possible to detect the input voltage Vin1 of the first shutdown module 22 and adjust the duty cycle of the first composite control signal according to the input voltage Vin1.

A peak value $\Delta V_{in1\_peak}$ of the input voltage of the first shutdown module 22 is:

$$\Delta V_{in1\_peak} = \frac{I_{PV1} * (1 - D) * T}{C_{in1}}. \quad (6)$$

A peak value $\Delta V_{o1\_peak}$ of the drop voltage ΔVo1 on the first output capacitor Co1 is:

$$\Delta V_{o1\_peak} = \frac{(I - I_{PV1}) * \Delta T}{C_{o1}} = \sqrt{\frac{C_{in1}}{C_{in1} + C_{o1}}} * \Delta V_{in1\_peak}, \quad (7)$$

where

ΔT is a time period in which the output voltage Vo1 decreases.

Therefore, it may be learnt that increasing the amplitude of the current ripple signal requires increasing the peak value $\Delta V_{o1\_peak}$ of the drop voltage ΔVo1. $\Delta V_{o1\_peak}$ is directly proportional to $\Delta V_{in1\_peak}$, and $\Delta V_{in1\_peak}$ is correlate with the duty cycle. Therefore, the duty cycle of the first composite control signal may be adjusted according to the peak value $\Delta V_{in1\_peak}$ of the input voltage Vin1. Specifically, when the peak value $\Delta V_{in1\_peak}$ of the input voltage Vin1 is greater than the first reference voltage, the duty cycle is increased; and when the peak value $\Delta V_{in1\_peak}$ of the input voltage Vin1 is less than the first reference voltage, the duty cycle is reduced, to increase the peak value of the drop voltage ΔVo1, and increase the amplitude of the current ripple signal, which meets a requirement of the amplitude of the carrier signal during data transmitting, and prevents data transmitting failure.

As an implementation of the present invention, it may be inferred from the foregoing formula that the average value $V_{in1\_ave}$ of the input voltage Vin1 of the first shutdown module 22 is:

$$V_{in1\_ave} = \frac{(1 - D) * \Delta V_{in1\_peak}}{2} + \frac{C_{in1} * C_{o1} * \Delta V_{in1\_peak}^2}{2T * (C_{in1} + C_{o1}) * (I - I_{PV1})}; \quad (8)$$

further, it is obtained that $$\Delta V_{in1\_peak} = \frac{\sqrt{b^2 + 4aV_{in1\_ave}} - b}{2a}; \quad (9)$$

$$a = \frac{C_{in1} * C_{o1}}{2T * (C_{in1} + C_{o1}) * (I - I_{PV1})}; \text{ and} \quad (10)$$

$$b = \frac{(1 - D)}{2}. \quad (11)$$

It may be learnt from the foregoing relationship between the peak value $\Delta V_{in1\_peak}$ of the input voltage $V_{in1}$ and the average value $V_{in1\_ave}$ of the input voltage $V_{in1}$ that the duty cycle of the first composite control signal may be adjusted according to the average value $V_{in1\_ave}$ of the input voltage $V_{in1}$. Specifically, when the average value $V_{in1\_ave}$ of the input voltage $V_{in1}$ is greater than the second reference voltage, the duty cycle is increased, and when the average value $V_{in1\_ave}$ of the input voltage $V_{in1}$ is less than the second reference voltage, the duty cycle is reduced, to increase the amplitude of the power line carrier signal, which meets a requirement of the amplitude of the carrier signal during data transmitting, and prevents data transmitting failure.

As an implementation of the present invention, a second photovoltaic module connected to the second shutdown module 32 supplies power to the control module 13.

In other embodiments, a quantity of shutdown modules in the shutdown device may be any quantity such as 3, 4, 5, and the like. Correspondingly, input ports of a shutdown device may be connected to 3, 4, 5, and the like photovoltaic modules, and the output port of the shutdown module corresponding to the photovoltaic module configured to supply power to the control module and the output port of the shutdown module configured to transmit data are connected in series.

Figure 10:
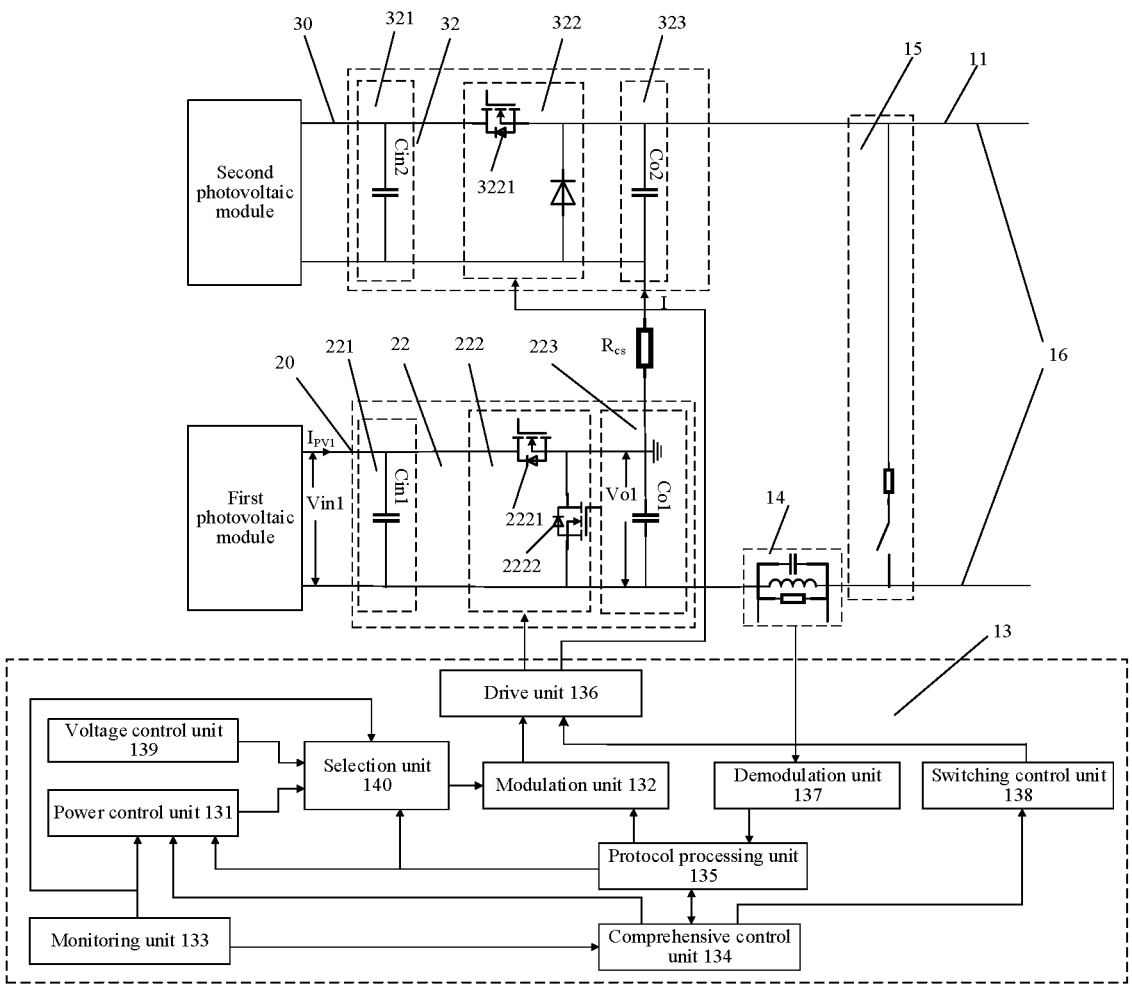
FIG. 10 is a system block diagram of a shutdown device according to a fifth embodiment of the present invention.

As an implementation of the present invention, as shown in the shutdown device in the fifth embodiment shown in FIG. 10, the first shutdown module 22 includes a bypass device 2222, and the bypass device 2222 is a switch. When the input state of the first input port 20 of the shutdown device is abnormal, during data transmitting, the first composite control signal controls the first switching device 2221 to work in a high-frequency switching state, and controls the bypass device 2222 to be in an off state; and when the input state of the first input port 20 of the shutdown device is abnormal, and when data transmitting is not performed, both the first switching device 2221 and the bypass device 2222 are in the on state, to provide a freewheeling path for the power bus current.

The present invention provides a communication method for a shutdown device, which may be applied to the shutdown device. The communication method for a shutdown device includes:

modulating a power control signal and a first communication signal, to generate a first composite control signal, where the power control signal is configured to adjust an output power of a first direct-current power supply coupled to a first input port 20 of the shutdown device; and controlling a first switching device 2221 of the first input port 20 of the shutdown device to work in a high-frequency switching state by the first composite control signal, to superimpose a current ripple signal including the first communication signal onto a power bus; and providing a switching control signal, where the switching control signal is used to control a switching of a second switching device of a second input port of the shutdown device.

As an implementation of the present invention, the communication method for a shutdown device further includes: adjusting an amplitude of the power control signal according to a power bus current of the shutdown device, and further controlling a duty cycle of the first composite control signal, to keep a peak value of a voltage ripple at the input port of the shutdown device within a predetermined ripple threshold.

As an implementation of the present invention, the communication method for a shutdown device further includes: during data transmitting, generating the power control signal according to the power bus current, and modulating the power control signal and the first communication signal to generate the first composite control signal, where the first composite control signal controls the first switching device 2221 of the shutdown device to work in the high-frequency switching state, and the switching control signal controls the second switching device 3221 of the shutdown device to be in an always-on state; and when data transmitting is completed, the first composite control signal controls the first switching device 2221 to be in the always-on state, and the switching control signal controls the second switching device 3221 to remain in the always-on state.

As an implementation of the present invention, when an input state of the first input port 20 of the shutdown device is abnormal, a duty cycle of the first composite control signal is controlled according to an input voltage of a first shutdown module 22 of the shutdown device during data transmitting.

Specifically, a voltage control signal is generated according to the input voltage of the first shutdown module 22, and the first communication signal and the voltage control signal are modulated to generate the first composite control signal. When the input state of the first input port 20 of the shutdown device is normal, the first communication signal and the power control signal are modulated, to generate the first composite control signal; and when the input state of the first input port 20 of the shutdown device is abnormal, the first communication signal and the voltage control signal are modulated to generate the first composite control signal during data transmitting. The first composite control signal controls the first switching device 2221 of the shutdown device to work in the high-frequency switching state. The switching control signal controls the second switching device 3221 of the shutdown device to be in an always-on state. When data transmitting is completed, the first communication signal and the power control signal are modulated, to generate the first composite control signal. The first composite control signal controls the first switching device 2221 to be in the always-on state, and the switching control signal controls the second switching device 3221 to remain the always-on state.

As an implementation of the present invention, the communication method for a shutdown device further includes: when a peak value of the input voltage of the first shutdown module 22 is greater than or equal to a preset first reference voltage, increasing the duty cycle of the first composite control signal, and when the peak value of the input voltage of the first shutdown module 22 is less than the first reference voltage, reducing the duty cycle of the first composite control signal.

As an implementation of the present invention, the communication method for a shutdown device further includes: when an average value of the input voltage of the first shutdown module 22 is greater than or equal to a preset second reference voltage, increasing the duty cycle of the first composite control signal, and when the average value of the input voltage of the first shutdown module 22 is less than the second reference voltage, reducing the duty cycle of the first composite control signal.

Figure 11:
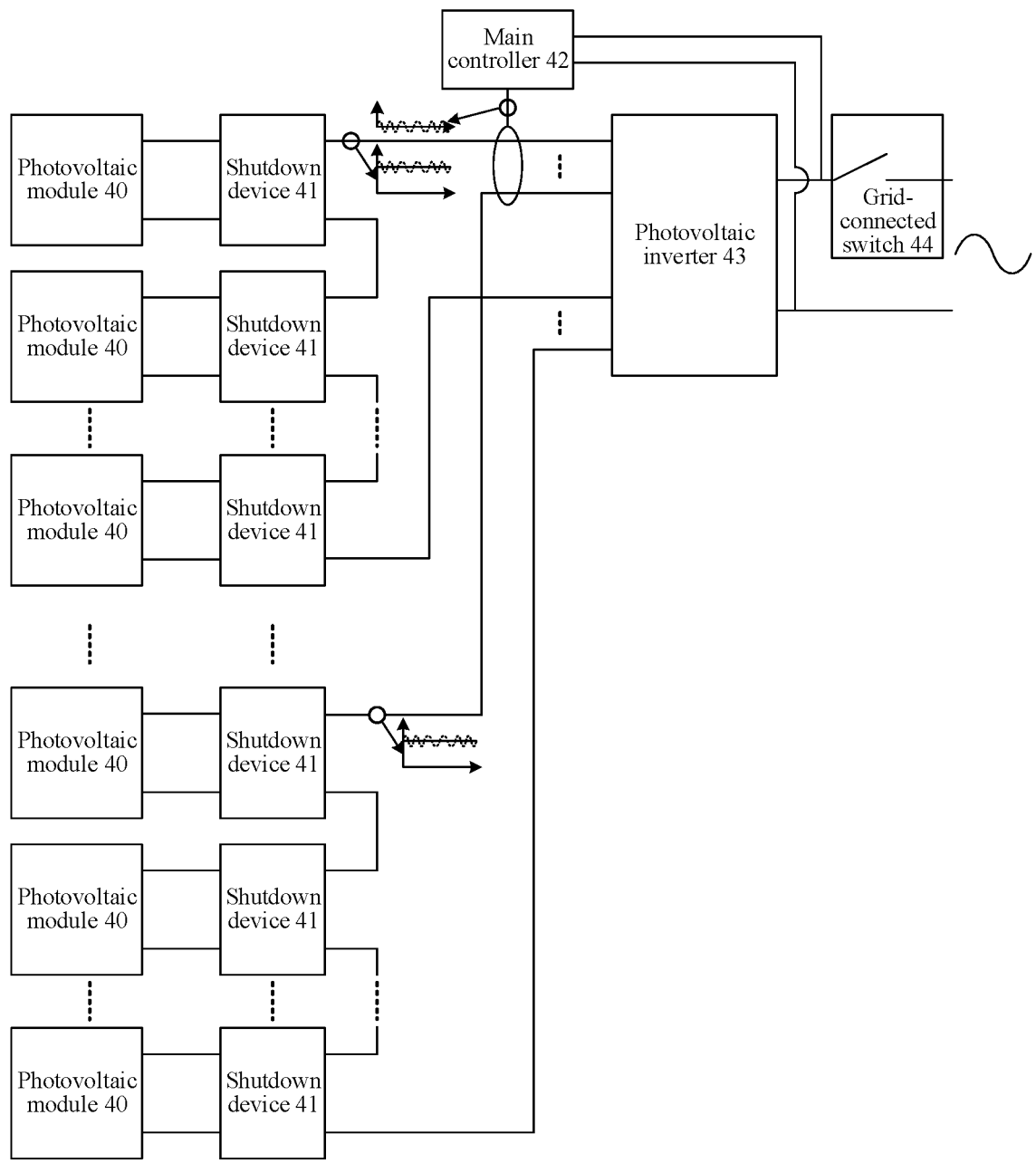
FIG. 11 is a system schematic diagram of a rapid shutdown photovoltaic system according to an embodiment of the present invention.

In an embodiment of the present invention as shown in FIG. 11, the present invention provides a rapid shutdown photovoltaic system. The system includes a plurality of photovoltaic modules 40, a plurality of shutdown devices 41, a main controller 42, a photovoltaic inverter 43, and a grid-connected switch 44, each shutdown device 41 is connected to a first photovoltaic module and a second photovoltaic module, the plurality of shutdown devices 41 are connected in series to a power bus, the power bus is connected to a direct-current input port of the photovoltaic inverter 43, the shutdown device 41 includes a first input port, at least one second input port, a first shutdown module connected to the first input port, a second shutdown module connected to the second input port, an output port, and a control module, the first shutdown module includes a first switching device, and the second shutdown module includes a second switching device, where the shutdown device 41 is configured to modulate a power control signal and a first communication signal to generate a first composite control signal, where the power control signal adjusts an output power of a first direct-current power supply coupled to the first input port, and the first composite control signal controls the first switching device to work in a high-frequency switching state, to superimpose a current ripple signal including the first communication signal onto the power bus, and the shutdown device is further configured to generate a switching control signal according to an operating mode of the shutdown device, to control a switching of the second switching device; and the main controller 42 is configured to extract the current ripple signal on the power bus, and demodulate and parse the current ripple signal, to obtain the first communication signal transmitted by the shutdown device.

The main controller 42 includes a power line carrier transceiver and a current transformer, a power line carrier signal (namely, the current ripple signal) coupled to the power bus by the shutdown device 41 is extracted by the current transformer, after demodulating and parsing the power line carrier signal by the power line carrier transceiver, a first data packet transmitted by each shutdown device 41 is obtained, the first data packet includes the operating data of the shutdown device 41. A second data packet including the control instructions of the shutdown device transmitted by the main controller 42 is encapsulated and modulated by the power line carrier transceiver, then coupled to the power bus through the current transformer, and are transmitted to each shutdown device 41 through the power bus.

The main controller 42 performs point-to-point communication with each shutdown device 41 in a master-slave polling manner. The main controller 42 regularly transmits control instructions to collect the operating data of the shutdown device 41, and controls the operating mode of the shutdown device. The control instructions of the main controller 42 include a permission to operate instruction, used for controlling an operating state of the photovoltaic system. When the permission to operate instruction is sent normally, if each shutdown device 41 normally receives the permission to operate instruction, each shutdown device 41 is in the normal operating mode, the switching device of the shutdown device is in the always-on state or the high-frequency switching state, the input photovoltaic module is normally connected in series to the power bus, and the photovoltaic system is in the normal operating state; and when the transmitting of the permission to operate instruction stops for a time period longer than a definite time period, each shutdown device 41 switches to the safe disconnection mode, and the switching device of each shutdown device 41 is in an off state. The photovoltaic module 40 at the input port of the shutdown device 41 is disconnected from the power bus, the power bus is quickly discharged to keep its voltage below a safe value within a specified time period, and the photovoltaic system is in the safe disconnection mode.

The shutdown device 41 extracts the power line carrier signal transmitted by the main controller 42 to the power bus through an internal RLC decoupling circuit, and obtains a polling instruction transmitted by the main controller through conditioning, demodulating, and parsing the power line carrier signal. If a collection address of the polling instruction matches an address of the shutdown device 41, the shutdown device 41 processes the collected operating data to generate the first composite control signal by the internal protocol processing unit, the power control unit, and the modulation unit. The switching device of the shutdown device 41 receives the first composite control signal and works in the high-frequency switching state, thereby the power line carrier signal carrying the operating data of the shutdown device 41 is injected into the power bus, and coupled to the main controller 42 through the power bus, so the main controller 42 may obtain the operating data of the shutdown device 41.

Although the preferred implementations of the present invention have been disclosed for illustrative purposes, a person of ordinary skill in the art will appreciate that various modifications, additions, and substitutions are possible without departing from the scope and spirit of the present invention as disclosed in the appended claims.

What is claimed is:

1. A shutdown device, wherein the shutdown device comprises:
   a first input port, configured to be coupled to a first direct-current power supply;
   at least one second input port, configured to be coupled to a second direct-current power supply;
   an output port, configured to be coupled to a power bus;
   a first shutdown module, connected to the first input port, wherein the first shutdown module comprises a first switching device, and the first switching device is configured to control an output power of the first direct-current power supply coupled to the first input port; and
   at least one second shutdown module, connected to the second input port, wherein the second shutdown module comprises a second switching device, and the second switching device is configured to control an output power of the second direct-current power supply coupled to the second input port, wherein
   an output of the first shutdown module and an output of the at least one second shutdown module are connected in series, and are connected to the output port;
   a control module, configured to modulate a power control signal and a first communication signal, to generate a first composite control signal, wherein the power control signal adjusts the output power of the first direct-current power supply coupled to the first input port, and the first composite control signal controls the first switching device to work in a high-frequency switching state, to superimpose a current ripple signal comprising the first communication signal onto the power bus; and
   the control module being further configured to generate a switching control signal, to control a switching of the second switching device.

2. The shutdown device according to claim 1, wherein the duty cycle of the first composite control signal is positively correlate with the power bus current, the larger the power bus current is, the larger the duty cycle is, and conversely, the smaller the duty cycle is.

3. The shutdown device according to claim 1, wherein the control module comprises:
   a power control unit, configured to generate the power control signal according to the power bus current;
   a modulation unit, configured to receive the first communication signal and the power control signal, and modulate the first communication signal and the power control signal to generate the first composite control signal; and
   a switching control unit, configured to generate the switching control signal that controls the switching of the second switching device.

4. The shutdown device according to claim 3, wherein the control module further comprises:
   a monitoring unit, configured to collect and obtain operating data of the shutdown device;
   a comprehensive control unit, configured to package the operating data of the shutdown device into a first data packet; and
   a protocol processing unit, configured to encapsulate the first data packet into the first communication signal according to a predetermined communication protocol, and provide the first communication signal to the modulation unit.

5. The shutdown device according to claim 4, wherein the shutdown device further comprises a signal decoupling module, configured to separate a power line carrier signal on the power bus from the power bus current, to extract the power line carrier signal;
   the control module further comprises a demodulation unit, configured to demodulate the extracted power line carrier signal to obtain a second communication signal; and the protocol processing unit is further configured to parse the second communication signal into a second data packet according to a protocol format, and provide the second data packet to the comprehensive control unit, and the comprehensive control unit parses the second data packet, to obtain control instructions in the second data packet, wherein the control instructions are used to control a working state of the shutdown device.

6. The shutdown device according to claim 4, wherein when an input state of the first input port of the shutdown device is abnormal, the control module controls the duty cycle of the first composite control signal according to an input voltage of the first shutdown module during data transmitting.

7. The shutdown device according to claim 6, wherein when a peak value of the input voltage of the first shutdown module is greater than or equal to a preset first reference voltage, the duty cycle of the first composite control signal is increased, and when the peak value of the input voltage of the first shutdown module is less than the first reference voltage, the duty cycle of the first composite control signal is reduced.

8. The shutdown device according to claim 6, wherein when an average value of the input voltage of the first shutdown module is greater than or equal to a preset second reference voltage, the duty cycle of the first composite control signal is increased, and when the average value of the input voltage of the first shutdown module is less than the second reference voltage, the duty cycle of the first composite control signal is reduced.

9. The shutdown device according to claim 6, wherein when monitoring that the input voltage of the first shutdown module of the shutdown device is less than a preset voltage threshold, the monitoring unit determines that the input state of the first input port is abnormal, otherwise determines that the input state of the first input port is normal, and outputs an input state detection signal used to represent the input state of the first input port.

10. The shutdown device according to claim 9, wherein the control module further comprises:
a voltage control unit, configured to generate a voltage control signal according to the input voltage of the first shutdown module; and a selection unit, separately connected to the power control unit and the voltage control unit, and configured to select to output the power control signal or the voltage control signal according to the input state detection signal, to control the duty cycle of the first composite control signal.

11. The shutdown device according to claim 10, wherein the voltage control unit comprises:
an error amplifier, configured to obtain an amplified value of a difference between the input voltage of the first shutdown module and a reference voltage; and
a controller, configured to generate the voltage control signal according to the amplified value of the difference.

12. The shutdown device according to claim 1, wherein a second direct-current power supply connected to a second shutdown module adjacent to the first shutdown module is configured to supply power to the control module.

13. The shutdown device according to claim 1, wherein the shutdown device further comprises a sampling resistor, separately connected to the first shutdown module and a second shutdown module adjacent to the first shutdown module, the sampling resistor is for obtaining a power bus current value, and a connection point between the sampling resistor and the first shutdown module serves as a common ground.

14. A communication method for a shutdown device, wherein the method comprises: modulating a power control signal and a first communication signal, to generate a first composite control signal, wherein the power control signal is used to adjust an output power of a first direct-current power supply coupled to a first input port of the shutdown device; and
controlling a first switching device of the first input port of the shutdown device to work in a high-frequency switching state by the first composite control signal, to superimpose a current ripple signal comprising the first communication signal onto a power bus; and
providing a switching control signal, wherein the switching control signal is used to control a switching of a second switching device of a second input port of the shutdown device.

15. The communication method for a shutdown device according to claim 14, wherein the method further comprises:
during data transmitting, generating the power control signal according to a power bus current, and modulating the power control signal and the first communication signal to generate the first composite control signal, wherein the first composite control signal controls the first switching device of the shutdown device to work in the high-frequency switching state, and the switching control signal controls the second switching device of the shutdown device to be in an always-on state; and
when data transmitting is completed, the first composite control signal controls the first switching device to be in an always-on state, and the switching control signal controls the second switching device to remain in the always-on state.

16. The communication method for a shutdown device according to claim 14, wherein the method further comprises:
when an input state of the first input port of the shutdown device is abnormal, controlling a duty cycle of the first composite control signal according to an input voltage of a first shutdown module of the shutdown device during data transmitting.

17. The communication method for a shutdown device according to claim 16, wherein when a peak value of the input voltage of the first shutdown module is greater than or equal to a preset first reference voltage, the duty cycle of the first composite control signal is increased, and when the peak value of the input voltage of the first shutdown module is less than the first reference voltage, the duty cycle of the first composite control signal is reduced.

18. The communication method for a shutdown device according to claim 16, wherein when an average value of the input voltage of the first shutdown module is greater than or equal to a preset second reference voltage, the duty cycle of the first composite control signal is increased, and when the average value of the input voltage of the first shutdown module is less than the second reference voltage, the duty cycle of the first composite control signal is reduced.

19. The communication method for a shutdown device according to claim 16, wherein the method further comprises:
when the input state of the first input port of the shutdown device is normal, modulating the first communication signal and the power control signal, to generate the first composite control signal; and
when the input state of the first input port of the shutdown device is abnormal, generating a voltage control signal according to the input voltage of the first shutdown module, and modulating the first communication signal and the voltage control signal to generate the first composite control signal during data transmitting, and when data transmitting is completed, modulating the first communication signal and the power control signal, to generate the first composite control signal.

20. A rapid shutdown photovoltaic system, wherein the system comprises a plurality of shutdown devices, a plurality of photovoltaic modules, a main controller, and a photovoltaic inverter, each shutdown device is connected to a first photovoltaic module and a second photovoltaic module, the plurality of shutdown devices are connected in series to a power bus, the power bus is connected to a direct-current input port of the photovoltaic inverter, the shutdown device comprises a first input port, at least one second input port, a first shutdown module connected to the first input port, a second shutdown module connected to the second input port, an output port, and a control module, the first shutdown module comprises a first switching device, and the second shutdown module comprises a second switching device, wherein the shutdown device is configured to modulate a power control signal and a first communication signal to generate a first composite control signal, wherein the power control signal adjusts an output power of a first photovoltaic module coupled to the first input port, and the first composite control signal controls the first switching device to work in a high-frequency switching state, to superimpose a current ripple signal comprising the first communication signal onto the power bus, and the shutdown device is further configured to generate a switching control signal, to control a switching of the second switching device; and the main controller is configured to extract the current ripple signal on the power bus, and demodulate and parse the current ripple signal, to obtain the first communication signal transmitted by the shutdown device.

* * * * *